US011871457B2

(12) United States Patent
Saha et al.

(10) Patent No.: US 11,871,457 B2
(45) Date of Patent: Jan. 9, 2024

(54) TRANSMITTING RANDOM ACCESS MESSAGES USING AERIAL USER EQUIPMENT SPECIFIC PARAMETERS

(71) Applicant: QUALCOMM Incorporated, San Diego, CA (US)

(72) Inventors: Chiranjib Saha, Blacksburg, VA (US); Le Liu, Fremont, CA (US); Alberto Rico Alvarino, San Diego, CA (US); Kazuki Takeda, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 17/305,213

(22) Filed: Jul. 1, 2021

(65) Prior Publication Data
US 2023/0007700 A1 Jan. 5, 2023

(51) Int. Cl.
*H04W 84/06* (2009.01)
*H04W 74/08* (2009.01)
*H04W 52/14* (2009.01)

(52) U.S. Cl.
CPC ..... *H04W 74/0841* (2013.01); *H04W 52/146* (2013.01); *H04W 84/06* (2013.01)

(58) Field of Classification Search
CPC ....... H04W 72/04; H04W 4/40; H04W 16/28; H04W 74/00; H04W 64/00; H04W 84/06; H04W 88/06; H04W 48/04; H04B 7/185
See application file for complete search history.

(56) References Cited

U.S. PATENT DOCUMENTS

| 2018/0317264 A1 | 11/2018 | Agiwal et al. |
| 2021/0021333 A1* | 1/2021 | Kusashima ........... H04W 88/02 |
| 2021/0037452 A1 | 2/2021 | Tsuda et al. |
| 2021/0074166 A1* | 3/2021 | Chang ................ H04B 7/18506 |

FOREIGN PATENT DOCUMENTS

WO 2020257387 12/2020

OTHER PUBLICATIONS

International Search Report and Written Opinion—PCT/US2022/072647—ISA/EPO—dated Aug. 29, 2022.

* cited by examiner

*Primary Examiner* — Tu X Nguyen
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive, from a base station via a system information block (SIB), a random access configuration associated with aerial UEs, wherein the random access configuration indicates one or more aerial UE specific parameters. The UE may transmit, to the base station, a random access message during a random access procedure based at least in part on the one or more aerial UE specific parameters indicated in the random access configuration associated with aerial UEs. Numerous other aspects are described.

30 Claims, 17 Drawing Sheets

```
RACH-ConfigCommonTwoStepRA-r16 ::= SEQUENCE {
    msgA-RSRP-Threshold-r16 RSRP-Range OPTIONAL, -- Cond 2Step4Step
    ...
    msgA-RSRP-Threshold-Aerial-rXX RSRP-Range OPTIONAL, -- Cond 2Step4Step
    OR
    isTwoStepRAProhibited ENUMERATED{true} OPTIONAL, -- Cond 2Step4Step
}
```

FIG. 11

```
MsgA-PUSCH-Config-Aerial-rXX ::= SEQUENCE {
    msgA-PUSCH-ResourceGroupA-Aerial-rXX MsgA-PUSCH-Resource-r16 OPTIONAL, -- Cond InitialBWPConfig
    msgA-PUSCH-ResourceGroupB-Aerial-rXX MsgA-PUSCH-Resource-r16 OPTIONAL, -- Cond GroupBConfigured
    msgA-TransformPrecoder-Aerial-rXX ENUMERATED {enabled, disabled} OPTIONAL, -- Need R
    msgA-DataScramblingIndex-Aerial-rXX INTEGER (0..1023) OPTIONAL, -- Need S
    msgA-DeltaPreamble-Aerial-rXX INTEGER (-1..6) OPTIONAL -- Need R
}
```

FIG. 12

```
PUSCH-ConfigCommon ::= SEQUENCE {
[[
msg3-DeltaPreamble-Aerial-rXX INTEGER (-1..6) OPTIONAL, -- Need R
]]
}
```

1300

TRANSMITTING RANDOM ACCESS MESSAGES USING AERIAL USER EQUIPMENT SPECIFIC PARAMETERS

FIELD OF THE DISCLOSURE

Aspects of the present disclosure generally relate to wireless communication and to techniques and apparatuses for transmitting random access messages using aerial user equipment (UE) specific parameters.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes a memory and one or more processors, coupled to the memory, configured to: receive, from a base station via a system information block (SIB), a random access configuration associated with aerial UEs, wherein the random access configuration indicates one or more aerial UE specific parameters; and transmit, to the base station, a random access message during a random access procedure based at least in part on the one or more aerial UE specific parameters indicated in the random access configuration associated with aerial UEs.

In some implementations, an apparatus for wireless communication at a base station includes a memory and one or more processors, coupled to the memory, configured to: transmit, to a UE via a SIB, a random access configuration associated with aerial UEs, wherein the random access configuration indicates one or more aerial UE specific parameters; and receive, from the UE, a random access message during a random access procedure, wherein the random access message is associated with the one or more aerial UE specific parameters indicated in the random access configuration associated with aerial UEs.

In some implementations, a method of wireless communication performed by a UE includes receiving, from a base station via a SIB, a random access configuration associated with aerial UEs, wherein the random access configuration indicates one or more aerial UE specific parameters; and transmitting, to the base station, a random access message during a random access procedure based at least in part on the one or more aerial UE specific parameters indicated in the random access configuration associated with aerial UEs.

In some implementations, a method of wireless communication performed by a base station includes transmitting, to a UE via a SIB, a random access configuration associated with aerial UEs, wherein the random access configuration indicates one or more aerial UE specific parameters; and receiving, from the UE, a random access message during a random access procedure, wherein the random access message is associated with the one or more aerial UE specific parameters indicated in the random access configuration associated with aerial UEs.

In some implementations, a non-transitory computer-readable medium storing a set of instructions for wireless communication includes one or more instructions that, when executed by one or more processors of a UE, cause the UE to: receive, from a base station via a SIB, a random access configuration associated with aerial UEs, wherein the random access configuration indicates one or more aerial UE specific parameters; and transmit, to the base station, a random access message during a random access procedure based at least in part on the one or more aerial UE specific parameters indicated in the random access configuration associated with aerial UEs.

In some implementations, a non-transitory computer-readable medium storing a set of instructions for wireless communication includes one or more instructions that, when executed by one or more processors of a base station, cause the base station to: transmit, to a UE via a SIB, a random access configuration associated with aerial UEs, wherein the random access configuration indicates one or more aerial UE specific parameters; and receive, from the UE, a random access message during a random access procedure, wherein the random access message is associated with the one or more aerial UE specific parameters indicated in the random access configuration associated with aerial UEs.

In some implementations, an apparatus for wireless communication includes means for receiving, from a base station via a SIB, a random access configuration associated with aerial apparatuses, wherein the random access configuration indicates one or more aerial apparatus specific parameters; and means for transmitting, to the base station, a random access message during a random access procedure based at least in part on the one or more aerial apparatus specific parameters indicated in the random access configuration associated with aerial apparatuses.

In some implementations, an apparatus for wireless communication includes means for transmitting, to a UE via a SIB, a random access configuration associated with aerial UEs, wherein the random access configuration indicates one or more aerial UE specific parameters; and means for receiving, from the UE, a random access message during a random access procedure, wherein the random access message is associated with the one or more aerial UE specific parameters indicated in the random access configuration associated with aerial UEs.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 11 is a diagram illustrating an example associated with indicating a random access type, in accordance with the present disclosure.

FIG. 12 is a diagram illustrating an example associated with indicating an uplink shared channel configuration for aerial UEs, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
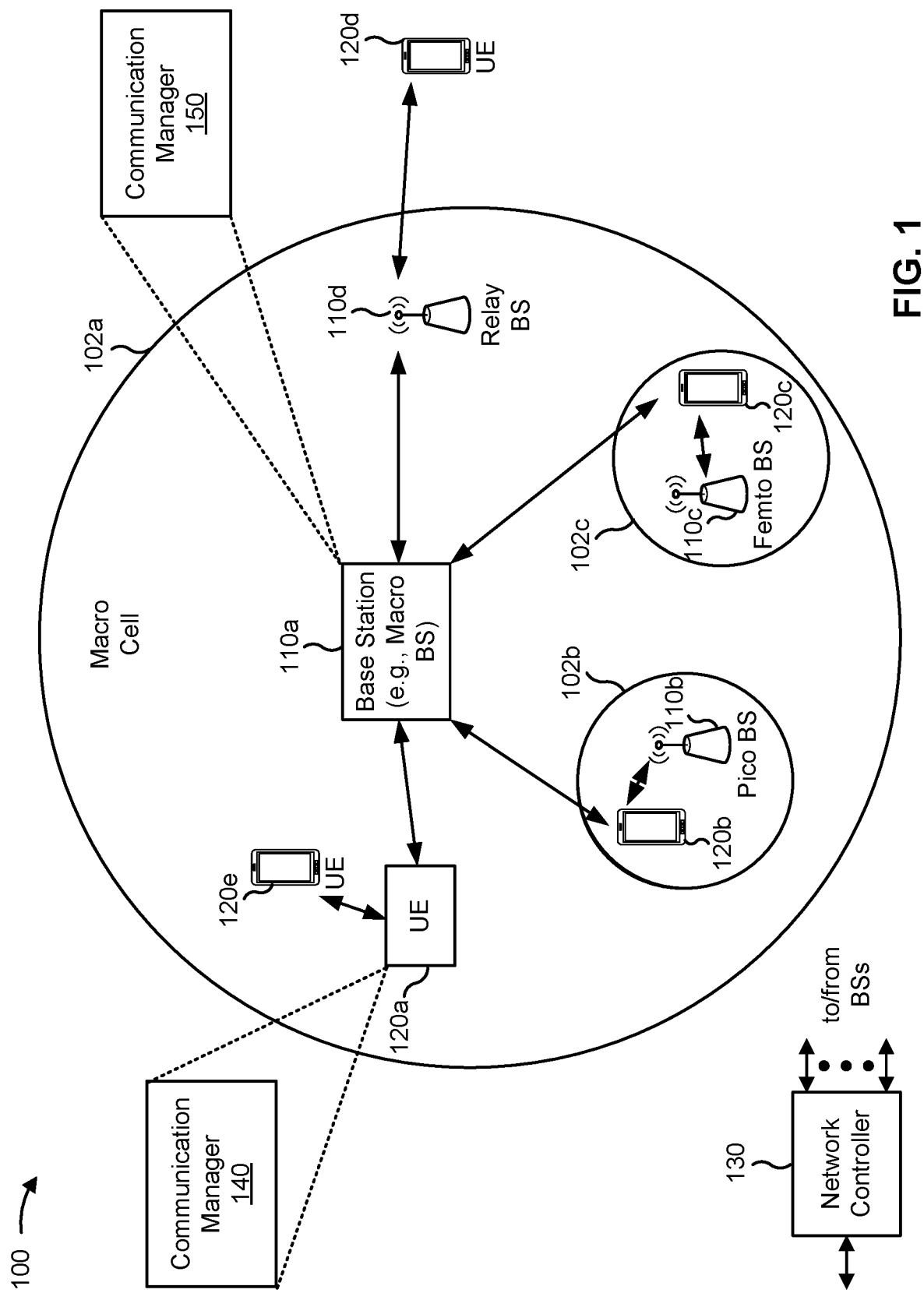
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V21) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may receive, from a base station via a SIB, a random access configuration associated with aerial UEs, wherein the random access configuration indicates one or more aerial UE specific parameters; and transmit, to the base station, a random access message during a random access procedure based at least in part on the one or more aerial UE specific parameters indicated in the random access configuration associated with aerial UEs. Additionally, or alternatively, the communication manager 140 may perform one or more other operations described herein.

In some aspects, a base station (e.g., base station 110) may include a communication manager 150. As described in more detail elsewhere herein, the communication manager 150 may transmit, to a UE via a SIB, a random access configuration associated with aerial UEs, wherein the random access configuration indicates one or more aerial UE specific parameters; and receive, from the UE, a random access message during a random access procedure, wherein the random access message is associated with the one or more aerial UE specific parameters indicated in the random access configuration associated with aerial UEs. Additionally, or alternatively, the communication manager 150 may perform one or more other operations described herein.

As indicated above, FIG. 1 is provided as an example. Other examples may differ from what is described with regard to FIG. 1.

Figure 2:
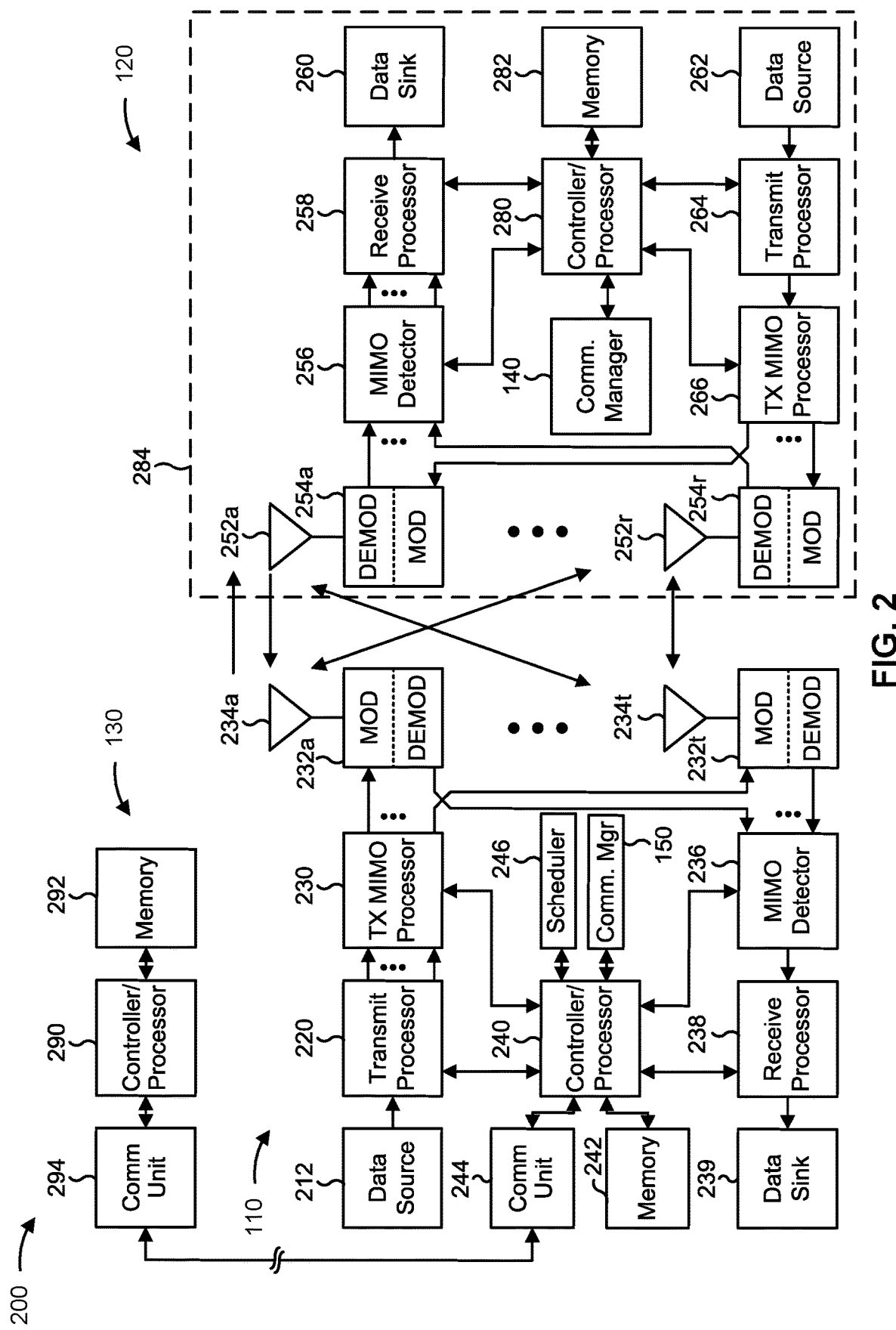
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110a, transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-15).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-15).

The controller/processor 240 of the base station 110, the controller/processor 280 of the UE 120, and/or any other component(s) of FIG. 2 may perform one or more techniques associated with transmitting random access messages using aerial UE specific parameters, as described in more detail elsewhere herein. For example, the controller/processor 240 of the base station 110, the controller/processor 280 of the UE 120, and/or any other component(s) of FIG. 2 may perform or direct operations of, for example, process 1400 of FIG. 14, process 1500 of FIG. 15, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1400 of FIG. 14, process 1500 of FIG. 14, and/or other processes as described herein. In some examples, executing instructions may include running the instructions, converting the instructions, compiling the instructions, and/or interpreting the instructions, among other examples.

In some aspects, a UE (e.g., UE 120) includes means for receiving, from a base station via a system information block (SIB), a random access configuration associated with aerial UEs, wherein the random access configuration indicates one or more aerial UE specific parameters; and/or means for transmitting, to the base station, a random access message during a random access procedure based at least in part on the one or more aerial UE specific parameters indicated in the random access configuration associated with aerial UEs. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a base station (e.g., base station includes 110) means for transmitting, to a UE via a SIB, a random access configuration associated with aerial UEs, wherein the random access configuration indicates one or more aerial UE specific parameters; and/or means for receiving, from the UE, a random access message during a random access procedure, wherein the random access message is associated with the one or more aerial UE specific parameters indicated in the random access configuration associated with aerial UEs. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 46.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
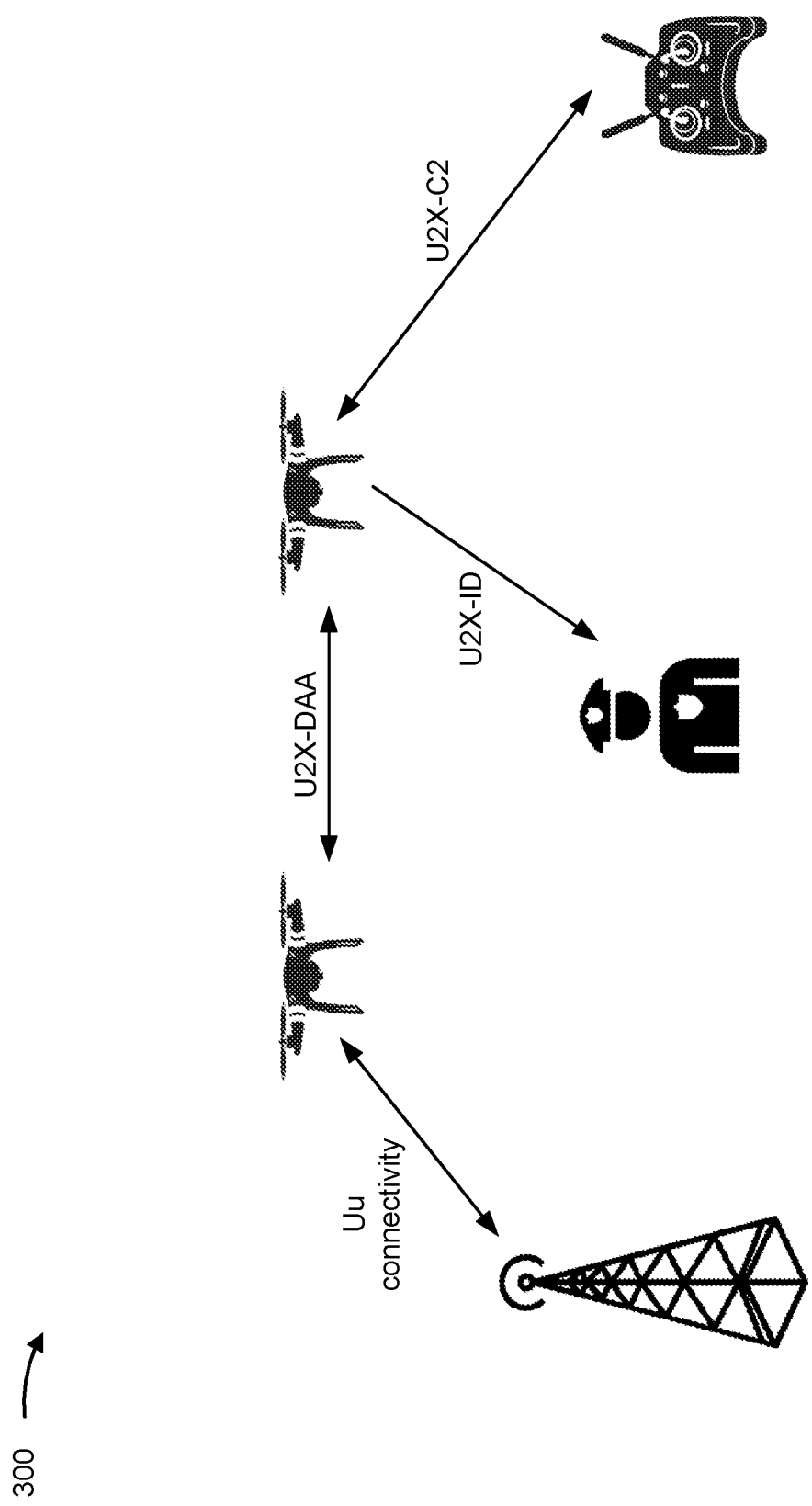
FIG. 3 is a diagram illustrating an example of a four-step random access procedure, in accordance with the present disclosure.

FIG. 3 is a diagram illustrating an example 300 of unmanned aerial vehicles, in accordance with the present disclosure.

As shown in FIG. 3, an unmanned aerial vehicle (UAV), or an aerial UE, may communicate with a variety of different entities. A UAV may communicate with a base station via a Uu connectivity for different applications, such as video or remote command and control (C2). A UAV may communicate with another unmanned UAV for UAV-to-everything detect and avoid (U2X-DAA), which may be for collision control. UAVs may communicate with each other via broadcast messages or via a PC5 interface. A UAV may communicate with a UE for U2X-ID, which may be for remote identification, via broadcast messages or via a PC5 interface. A UAV may communicate with a controller for U2X-C2 via a PC5 interface or via bidirectional messages.

As indicated above, FIG. 3 is provided as an example. Other examples may differ from what is described with regard to FIG. 3.

Figure 4:
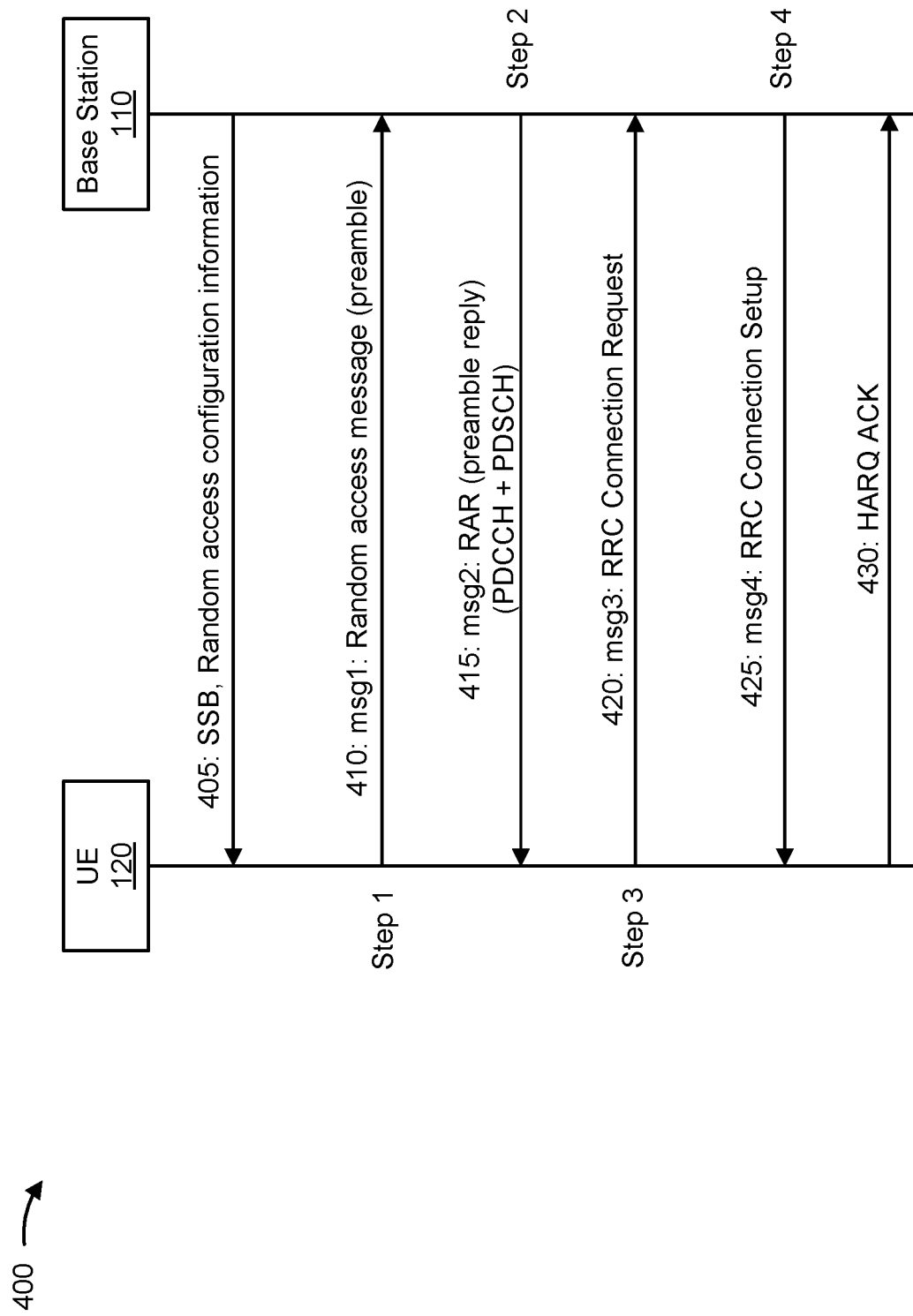
FIG. 4 is a diagram illustrating an example of a two-step random access procedure, in accordance with the present disclosure.

FIG. 4 is a diagram illustrating an example 400 of a four-step random access procedure, in accordance with the present disclosure. As shown in FIG. 4, a base station 110 and a UE 120 may communicate with one another to perform the four-step random access procedure.

As shown by reference number 405, the base station 110 may transmit, and the UE 120 may receive, one or more synchronization signal blocks (SSBs) and random access configuration information. In some aspects, the random access configuration information may be transmitted in and/or indicated by system information (e.g., in one or more SIBs). Additionally, or alternatively, the random access configuration information may be transmitted in a radio resource control (RRC) message and/or a physical downlink control channel (PDCCH) order message that triggers a RACH procedure, such as for contention-free random access. The random access configuration information may include one or more parameters to be used in the random access procedure, such as one or more parameters for transmitting a random access message (RAM) and/or one or more parameters for receiving a random access response (RAR).

As shown by reference number 410, the UE 120 may transmit a RAM, which may include a preamble (sometimes referred to as a random access preamble, a physical random access channel (PRACH) preamble, or a RAM preamble). The message that includes the preamble may be referred to as a message 1, msg1, MSG1, a first message, or an initial message in a four-step random access procedure. The random access message may include a random access preamble identifier.

As shown by reference number 415, the base station 110 may transmit an RAR as a reply to the preamble. The message that includes the RAR may be referred to as message 2, msg2, MSG2, or a second message in a four-step random access procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3).

In some aspects, as part of the second step of the four-step random access procedure, the base station 110 may transmit a PDCCH communication for the RAR. The PDCCH communication may schedule a physical downlink shared channel (PDSCH) communication that includes the RAR. For example, the PDCCH communication may indicate a resource allocation for the PDSCH communication. Also as part of the second step of the four-step random access procedure, the base station 110 may transmit the PDSCH communication for the RAR, as scheduled by the PDCCH communication. The RAR may be included in a medium access control (MAC) protocol data unit (PDU) of the PDSCH communication.

As shown by reference number 420, the UE 120 may transmit an RRC connection request message. The RRC connection request message may be referred to as message 3, msg3, MSG3, or a third message of a four-step random access procedure. In some aspects, the RRC connection request may include a UE identifier, uplink control information (UCI), and/or a physical uplink shared channel (PUSCH) communication (e.g., an RRC connection request).

As shown by reference number 425, the base station 110 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, and/or contention resolution information. As shown by reference number 430, if the UE 120 successfully receives the RRC connection setup message, the UE 120 may transmit a hybrid automatic repeat request (HARQ) acknowledgement (ACK).

In some aspects, prior to the four-step random access procedure, the base station 110, to the UE 120 via a SIB, a random access configuration associated with aerial UEs. The random access configuration may indicate one or more aerial UE specific parameters. The UE 120 may perform the four-step random access procedure based at least in part on the one or more aerial UE specific parameters.

As indicated above, FIG. 4 is provided as an example. Other examples may differ from what is described with regard to FIG. 4.

Figure 5:
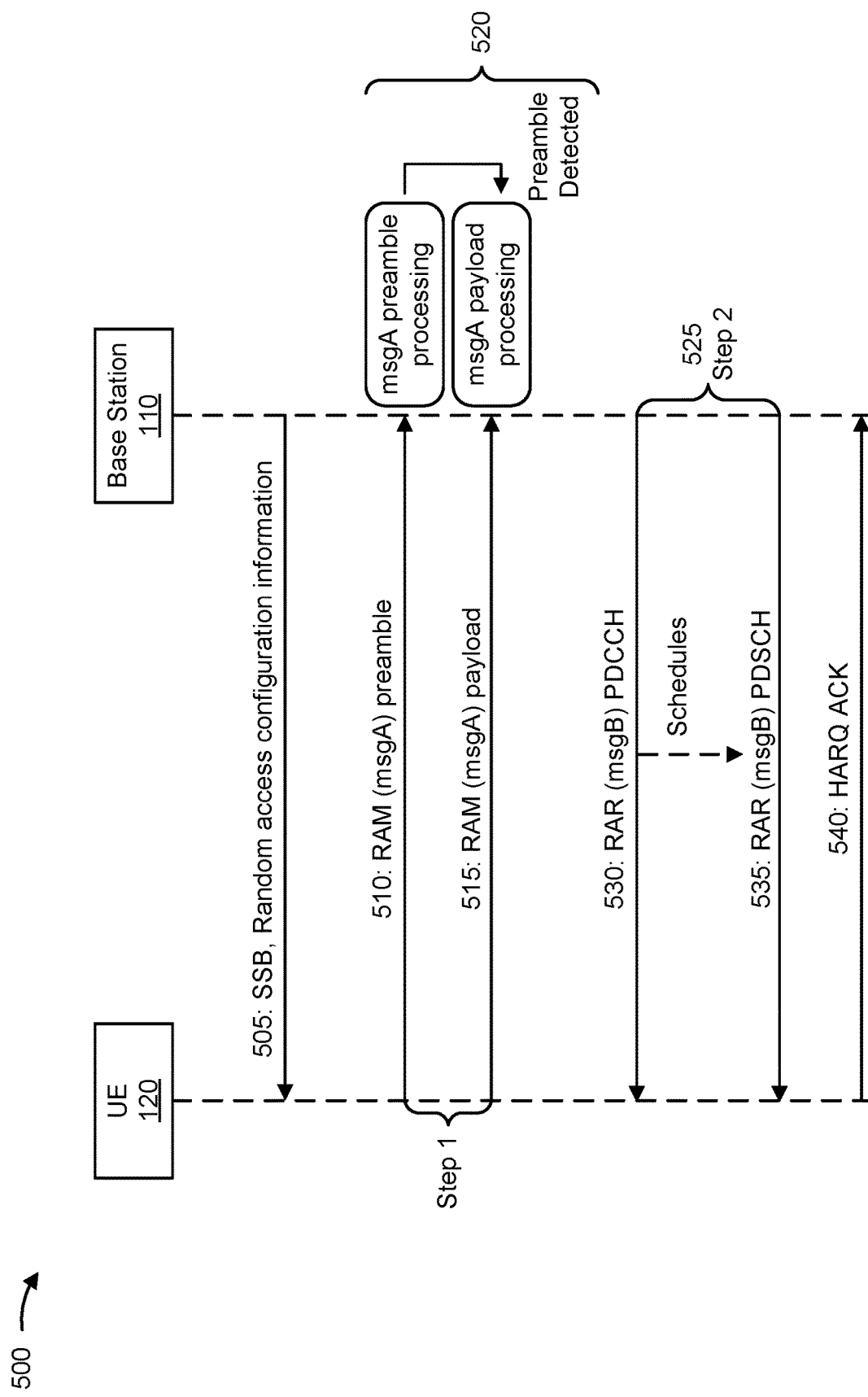
FIG. 5 is a diagram illustrating an example of unmanned aerial vehicles, in accordance with the present disclosure.

FIG. 5 is a diagram illustrating an example 500 of a two-step random access procedure, in accordance with the present disclosure. As shown in FIG. 5, a base station 110 and a UE 120 may communicate with one another to perform the two-step random access procedure.

As shown by reference number 505, the base station 110 may transmit, and the UE 120 may receive, one or more SSBs and random access configuration information. In some aspects, the random access configuration information may be transmitted in and/or indicated by system information (e.g., in one or more SIBs) and/or an SSB, such as for contention-based random access. Additionally, or alternatively, the random access configuration information may be transmitted in an RRC message and/or a PDCCH order message that triggers a RACH procedure, such as for contention-free random access. The random access configuration information may include one or more parameters to be used in the two-step random access procedure, such as one or more parameters for transmitting a RAM and/or receiving an RAR to the RAM.

As shown by reference number 510, the UE 120 may transmit, and the base station 110 may receive, a RAM preamble. As shown by reference number 515, the UE 120 may transmit, and the base station 110 may receive, a RAM payload. As shown, the UE 120 may transmit the RAM preamble and the RAM payload to the base station 110 as part of an initial (or first) step of the two-step random access procedure. In some aspects, the RAM may be referred to as message A, msgA, a first message, or an initial message in a two-step random access procedure. Furthermore, in some aspects, the RAM preamble may be referred to as a message A preamble, a msgA preamble, a preamble, or a PRACH preamble, and the RAM payload may be referred to as a message A payload, a msgA payload, or a payload. In some aspects, the RAM may include some or all of the contents of message 1 (msg1) and message 3 (msg3) of a four-step random access procedure, which is described in more detail below. For example, the RAM preamble may include some or all contents of message 1 (e.g., a PRACH preamble), and the RAM payload may include some or all contents of message 3 (e.g., a UE identifier, UCI, and/or a PUSCH transmission).

As shown by reference number 520, the base station 110 may receive the RAM preamble transmitted by the UE 120. If the base station 110 successfully receives and decodes the RAM preamble, the base station 110 may then receive and decode the RAM payload.

As shown by reference number 525, the base station 110 may transmit an RAR (sometimes referred to as an RAR message). As shown, the base station 110 may transmit the RAR message as part of a second step of the two-step random access procedure. In some aspects, the RAR message may be referred to as message B, msgB, or a second message in a two-step random access procedure. The RAR message may include some or all of the contents of message 2 (msg2) and message 4 (msg4) of a four-step random access procedure. For example, the RAR message may include the detected PRACH preamble identifier, the detected UE identifier, a timing advance value, and/or contention resolution information.

As shown by reference number 530, as part of the second step of the two-step random access procedure, the base station 110 may transmit a PDCCH communication for the RAR. The PDCCH communication may schedule a PDSCH communication that includes the RAR. For example, the PDCCH communication may indicate a resource allocation (e.g., in downlink control information (DCI)) for the PDSCH communication.

As shown by reference number 535, as part of the second step of the two-step random access procedure, the base station 110 may transmit the PDSCH communication for the RAR, as scheduled by the PDCCH communication. The RAR may be included in a MAC PDU of the PDSCH communication. As shown by reference number 540, if the UE 120 successfully receives the RAR, the UE 120 may transmit a HARQ ACK.

In some aspects, prior to the two-step random access procedure, the base station 110 may transmit, to the UE 120 via a SIB, a random access configuration associated with aerial UEs. The random access configuration may indicate one or more aerial UE specific parameters. The UE 120 may perform the two-step random access procedure based at least in part on the one or more aerial UE specific parameters.

As indicated above, FIG. 5 is provided as an example. Other examples may differ from what is described with regard to FIG. 5.

For an initial access, a UE may transmit a preamble (e.g., msg1 or msgA) to a base station. The UE may transmit the preamble at a given power level, which may be based at least in part on a PRACH power control calculation. For an active uplink bandwidth part (BWP) b of a carrier f of a serving cell c based at least in part on a downlink reference signal for the serving cell c for a Tx occasion i, $P_{PRACH,b,f,c} = \min\{P_{CMAX,f,c}, P_{PRACH,target,f,c} + PL_{b,f,c}\}$ dBm, where $P_{PRACH,b,c}$ indicates a transmission power for a PRACH, $P_{CMAX,f,c}$ is a UE configured maximum output power, $P_{PRACH,target,f,c}$ is a PRACH target reception power provided by higher layers, and $PL_{b,f,c}$ is a pathloss for the active BWP b of the carrier f. The PRACH target reception power may be set as a PREAMBLE_RECEIVED_TARGET_POWER, which may be set based at least in part on a preambleReceivedTargetPower parameter, a delta preamble, a preamble power ramping counter, a preamble power ramping step, and a power offset step for a msg1 transmission associated with a four-step random access procedure. Alternatively, the PREAMBLE_RECEIVED_TARGET_POWER may be set based at least in part on a preambleReceivedTargetPower parameter, a delta preamble, a preamble power ramping counter, and a preamble power ramping step for a msgA transmission associated with a two-step random access procedure.

The UE may transmit a msg3 of the four-step random access procedure with a transmission power that corresponds to a PUSCH transmission power. For a PUSCH on active UL BWP b of a carrier f of a serving cell c using a parameter set configuration with index j and a PUSCH power control adjustment state with index 1, the UE may determine a PUSCH transmission power on an i-th transmission occasion as:

$$P_{msg3,f,c}(i) = \min\begin{cases} P_{CMAX,f,c}(i), \\ P_{O\_PRE} + \Delta_{PREAMBLE\_msg3} + \alpha_{b,f,c}(0).PL_{b,f,c}(q_d), \text{ where } q_d \text{ is an} \\ [dBm] \end{cases}$$

index of a downlink reference signal, such as a synchronization signal (SS) or physical broadcast channel (PBCH) block or a channel state information reference signal (CSI-RS). Further, $P_{O\_PRE}$ indicates a preamble received target power and $\Delta_{PREAMBLE\text{-}msg3}$ indicates a msg3 delta preamble, which may be part of a PUSCH configuration (PUSCH-ConfigCommon) in a system information block type 1 (SIB1). Further, $\alpha_{b,f,c}(0)$ may be indicated by a msg3 alpha (msg3-Alpha) parameter in a PUSCH configuration, which may be used to configure UE specific PUSCH parameters applicable to a particular BWP. In some cases, $\alpha_{b,f,c}(0)$ may be set to one.

Figure 6:
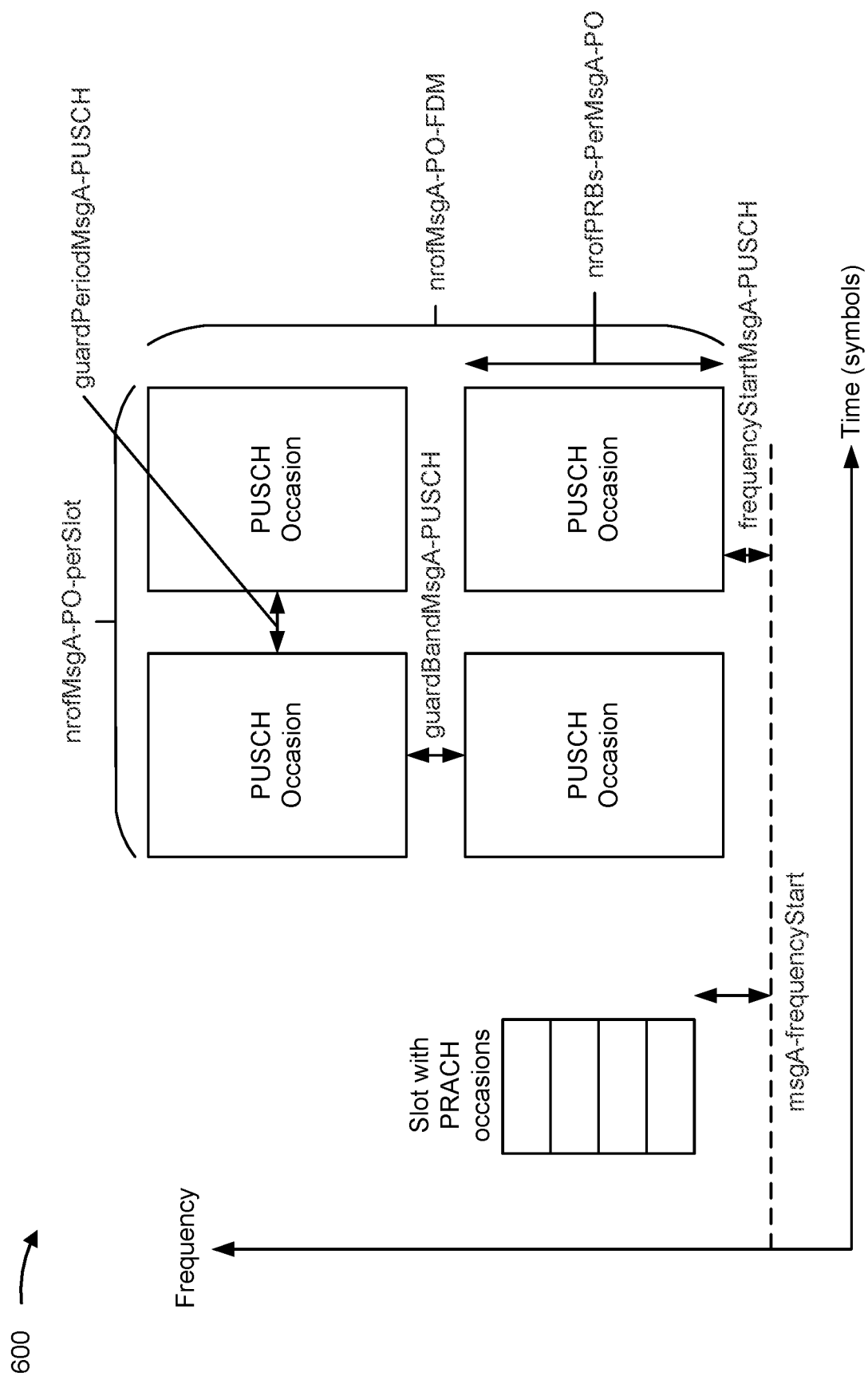
FIG. 6 is a diagram illustrating an example of resources for a two-step random access procedure, in accordance with the present disclosure.

FIG. 6 is a diagram illustrating an example 600 of resources for a two-step random access procedure, in accordance with the present disclosure.

As shown in FIG. 6, the resources for the two-step random access procedure may include PRACH occasions and PUSCH occasions. A UE may use the PRACH occasions to transmit a preamble in msgA to a base station. The UE may use the PUSCH occasions to transmit data in msgA to the base station. The PRACH occasions may be associated with a msgA frequency start (msgA-frequencyStart) parameter. The PUSCH occasions may be associated with a frequency start msgA PUSCH (frequencyStartMsgA-PUSCH) parameter. PUSCH occasions in a time domain may be associated with a number of msg3 PUSCH occasions per slot (nrofMsgA-PO-perSlot) parameter, and a guard period between PUSCH occasions in the time domain may be defined by a guard period msgA PUSCH (guardPeriodMsgA-PUSCH) parameter. PUSCH occasions in a frequency domain may be associated with a number of msgA PUSCH occasions with frequency division multiplexing (FDM) (nroMsgA-PO-FDM) parameter, and a guard band between PUSCH occasions in the frequency domain may be defined by a guard band msgA PUSCH (guardBandMsgA-PUSCH) parameter. A given PUSCH occasion may be associated with a number of physical resource blocks (PRBs) per msgA PUSCH occasion (nrofPRBs-PerMsgA-PO) parameter.

As indicated above, FIG. 6 is provided as an example. Other examples may differ from what is described with regard to FIG. 6.

Figure 7:
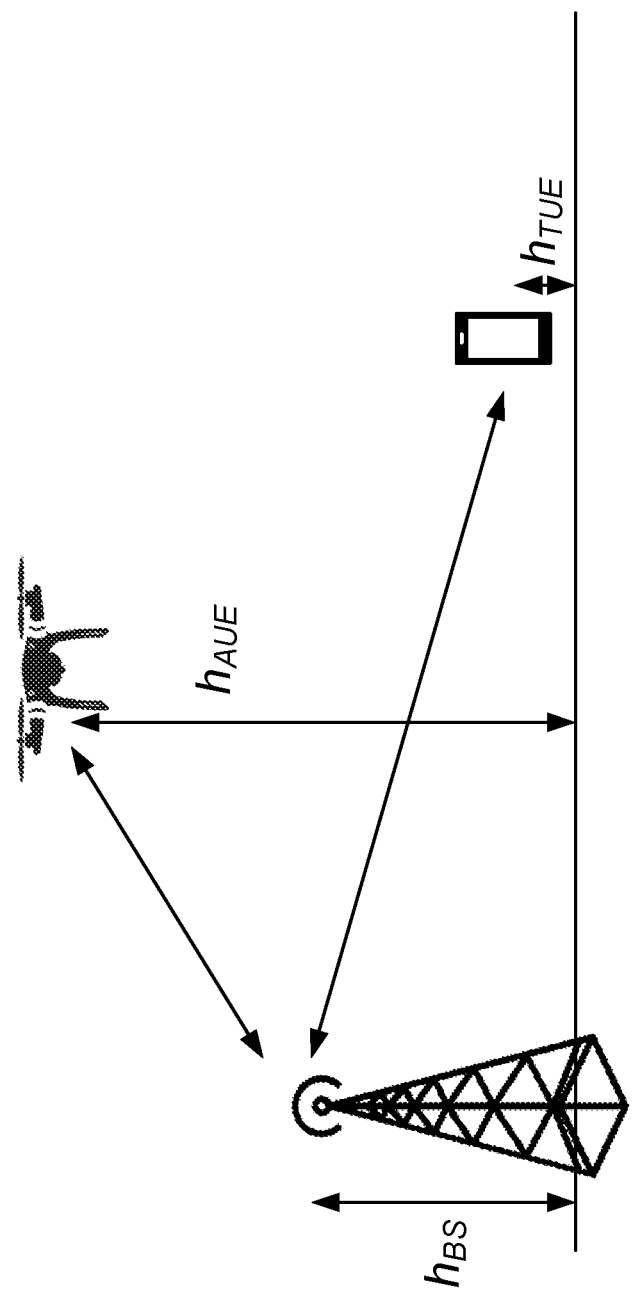
FIG. 7 is a diagram illustrating an example of a base station that communicates with a terrestrial UE and an aerial UE, in accordance with the present disclosure.

FIG. 7 is a diagram illustrating an example 700 of a base station that communicates with a terrestrial UE and an aerial UE, in accordance with the present disclosure.

As shown in FIG. 7, the base station may communicate with the terrestrial UE (e.g., or a non-aerial UE, such as a mobile phone) and the aerial UE. The base station may be approximately 25 meters in height. The terrestrial UE may be associated with a height of 1.5 meters. The aerial UE may be associated with a height of 22-300 meters. When the base station communicates with either the terrestrial UE or the aerial UE, a line of sight probability may increase with height. In other words, increasing a height associated with the terrestrial UE or the UAV may increase a probability that the terrestrial UE or the UAV has a line of sight with the base station. Once the height satisfies a threshold, a line of sight probability may approach 90% or more. A probability of serving cells and/or interfering cells being line of sight with an aerial UE is relatively high, due to a relatively large height typically associated with an aerial UE.

As indicated above, FIG. 7 is provided as an example. Other examples may differ from what is described with regard to FIG. 7.

A UE may perform a random access procedure with a base station. The UE may perform the random access procedure based at least in part on random access parameters. The UE may receive a broadcast of the random access parameters via a SIB1. The random access parameters may be cell-specific parameters. The random access parameters may indicate a target preamble received power. However, the random access parameters may be the same for all UEs, including both terrestrial UEs and aerial UEs. In other words, the random access parameters may not differentiate terrestrial UEs from aerial UEs, even though terrestrial UEs and aerial UEs are associated with significantly different heights and lines of sight with the base station. For example, when a target preamble received power for an aerial UE is the same as a target preamble received power for a terrestrial UE, an interference during a preamble reception may be increased, which may cause more potential random access failure. The interference may increase since the aerial UE is likely to have a line of sight with the base station, whereas the terrestrial UE is not as likely to have a line of sight with the base station as compared to the aerial UE.

In various aspects of techniques and apparatuses described herein, a UE may be considered to be an aerial UE or may be classified as an aerial UE based at least in part on an aerial subscription, a height associated with the UE that satisfies a threshold, and/or an up-tilted base station beam associated with a random access. The UE may receive, from a base station via a SIB1, a random access configuration associated with aerial UEs. The random access configuration may indicate one or more aerial UE specific parameters. The random access configuration may indicate random access occasions for aerial UEs, power control parameters for aerial UEs, a random access type, and/or a msgA uplink shared channel configuration for aerial UEs. The one or more aerial UE specific parameters may be different than random access parameters associated with terrestrial UEs, which may not have an aerial subscription, a height that does not satisfy a threshold, and/or a down-tilted base station beam associated with a random access. The UE may transmit, to the base station, a random access message during a random access procedure based at least in part on the one or more aerial UE specific parameters indicated in the random access configuration associated with aerial UEs. The random access message may be a msg1 of a four-step random access procedure, a msgA of a two-step random access procedure, or a msg3 of the four-step random access procedure. When the UE is considered to be an aerial UE, the UE may be configured with a different random access configuration as compared to terrestrial UEs, which may reduce interference and improve a performance at the base station.

In some aspects, the base station may indicate, via the SIB1, different random access configurations for aerial UEs in relation to terrestrial UEs. The base station may indicate different random access parameters related to msg1 and MsgA of the four-step random access procedure and the two-step random access procedure, respectively, for aerial UEs in relation to terrestrial UEs. The different random access parameters may be associated with random access occasions, power control parameters for a msg1 and msgA PRACH, a random access type (e.g., two-step random access procedure or four-step random access procedure), and/or a msgA PUSCH configuration for aerial UEs during a two-step random access procedure. Further, the base station may indicate, via the SIB1, different random access parameters related to msg3 of the four-step random access procedure. As a result, aerial UEs and terrestrial UEs may be configured with different random access occasions, different power control parameters (e.g., different target preamble received powers), different random access types, and/or different msgA PUSCH configurations for aerial UEs, due to different conditions (e.g., heights) associated with the aerial UEs in relation to the terrestrial UEs.

In some aspects, the UE may be considered to be an aerial UE when various conditions are satisfied. The conditions may be associated with an aerial subscription, a UE height, and/or a base station beam associated with random access. The base station beam may be identified based at least in part on an SSB or a CSI-RS index. As an example, a UE with no aerial subscription may not be considered to be an aerial UE, whereas a UE with an aerial subscription may be considered to be an aerial UE. As another example, a UE with no aerial subscription or a UE with an aerial subscription and below a height threshold may not be considered to be an aerial UE, whereas a UE with an aerial subscription and above a height threshold may be considered to be an aerial UE. As yet another example, a UE with an aerial subscription and random access resources associated with an up-tilted beam (e.g., an SSB index i) may be considered to be an aerial UE, whereas other UEs may not be considered to be aerial UEs. As yet another example, a UE with random access resources associated with an up-tilted beam (e.g., an SSB index i) may be considered to be an aerial UE, whereas other UEs may not be considered to be aerial UEs.

In some aspects, a UE that does not have an aerial subscription may be considered to be a terrestrial UE. A UE with a height that does not satisfy a height threshold may be considered to be a terrestrial UE. A UE that performs random access on an SSB or CSI-RS associated with a down-tilted beam may be considered to be a terrestrial UE. Terrestrial UEs may receive, from the base station, random access configurations that are different than random access configurations received at aerial UEs.

Figure 8:
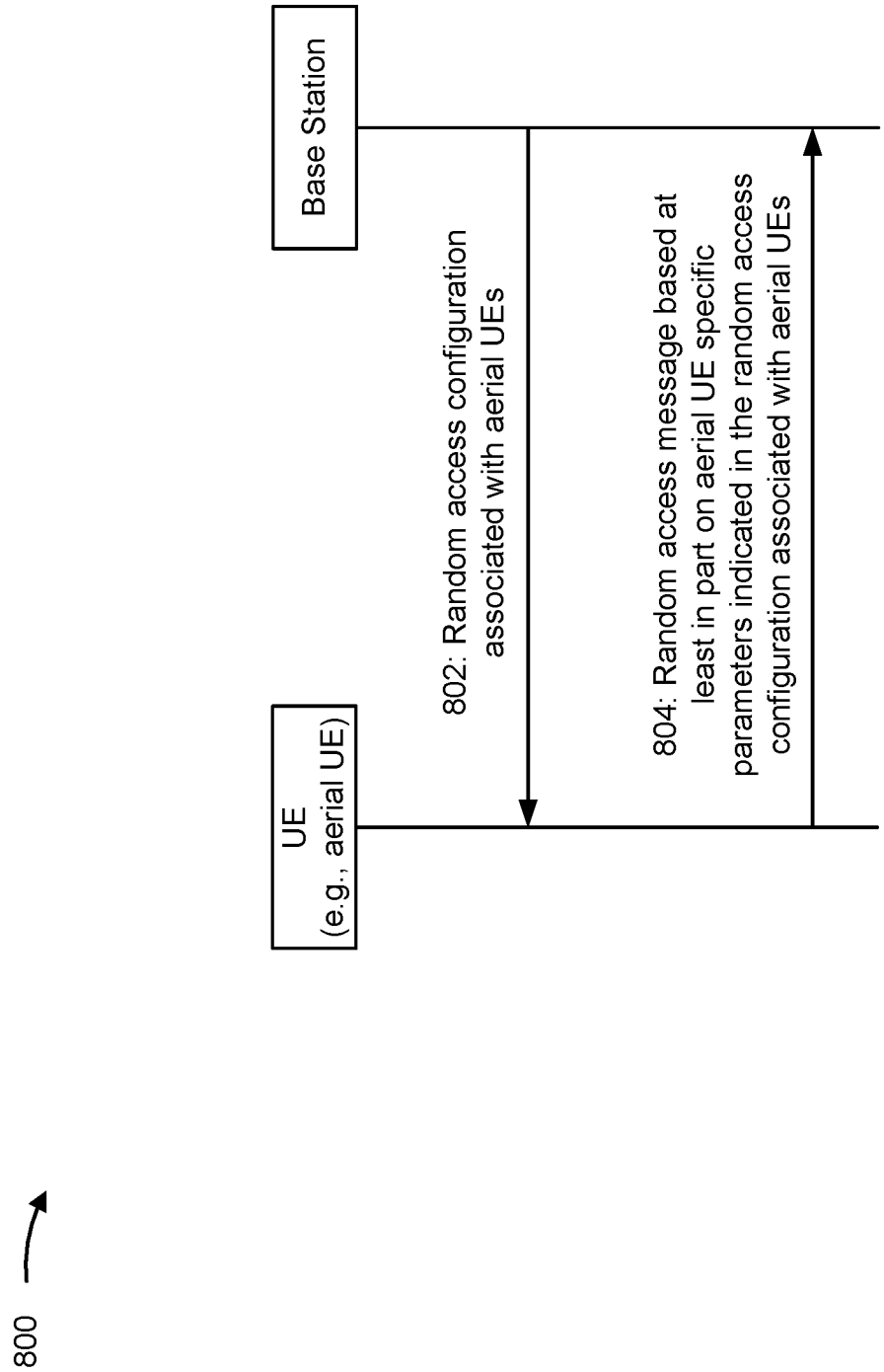
FIG. 8 is a diagram illustrating an example associated with transmitting random access messages using aerial UE specific parameters, in accordance with the present disclosure.

FIG. 8 is a diagram illustrating an example 800 associated with transmitting random access messages using aerial UE specific parameters, in accordance with the present disclosure. As shown in FIG. 8, example 800 includes communication between a UE (e.g., UE 120) and a base station (e.g., base station 110). In some aspects, the UE and the base station may be included in a wireless network, such as wireless network 100.

As shown by reference number 802, the UE may receive, from a base station via a SIB, a random access configuration associated with aerial UEs. The random access configuration may indicate one or more aerial UE specific parameters. The SIB may be a SIB1 or another suitable SIB for conveying the random access configuration.

In some aspects, the UE may be considered to be an aerial UE based at least in part on an aerial subscription, a height associated with the UE that satisfies a threshold, and/or an up-tilted base station beam associated with a random access. On the other hand, a terrestrial UE may have a lack of aerial subscription, a height that does not satisfy a threshold, and/or a down-tilted base station beam associated with a random access.

In some aspects, the random access configuration indicating the one or more aerial UE specific parameters is associated with random access occasions for aerial UEs, power control parameters for aerial UEs, a random access type, and/or a msgA uplink shared channel configuration for aerial UEs.

In some aspects, the random access occasions for aerial UEs may be associated with first frequencies in an uplink bandwidth part, and random access occasions for terrestrial UEs may be associated with second frequencies in the uplink bandwidth part. The random access occasions for aerial UEs may be associated with a frequency start parameter.

In some aspects, the power control parameters for aerial UEs may be different than power control parameters for terrestrial UEs. The power control parameters for aerial UEs may include a preamble received target power parameter, a preamble transmission maximum parameter, a power ramping step parameter, a frequency division multiplexing parameter associated with a msg1 or a msgA of the random access procedure, and/or a frequency start parameter associated with the msg1 or the msgA of the random access procedure.

In some aspects, the random access type may indicate that a two-step random access procedure is barred for aerial UEs. In some aspects, the random access type may indicate a first msgA power threshold associated with aerial UEs and a second msgA power threshold associated with terrestrial UEs. The first msgA power threshold associated with aerial UEs may be greater than the second msgA power threshold associated with terrestrial UEs. The UE may be configured for either the two-step random access procedure or a four-step random access procedure based at least in part on a bandwidth part selected for the random access procedure being configured for both the two-step random access procedure and the four-step random access procedure.

In some aspects, the msgA uplink shared channel configuration (e.g., a PUSCH configuration) for aerial UEs may be different than a msgA uplink shared channel configuration for terrestrial UEs. The msgA uplink shared channel configuration for aerial UEs may be associated with msgA of a two-step random access procedure. The msgA uplink shared channel configuration for aerial UEs may indicate that resource blocks for msgA uplink shared channel occasions for aerial UEs do not overlap in time or frequency with resource blocks for msgA uplink shared channel occasions for terrestrial UEs. In some aspects, the msgA uplink shared channel configuration for aerial UEs may indicate that a msgA uplink shared channel power control for aerial UEs is different than a msgA uplink shared channel power control for terrestrial UEs.

In some aspects, the power control parameters for aerial UEs may include a msg3 delta preamble for aerial UEs that is different than a msg3 delta preamble for terrestrial UEs. The msg3 delta preamble may be associated with a four-step random access procedure.

As shown by reference number 804, the UE may transmit, to the base station, a random access message during a random access procedure based at least in part on the one or more aerial UE specific parameters indicated in the random access configuration associated with aerial UEs. In some aspects, the random access message may be the msg1 of the four-step random access procedure, the msgA of the two-step random access procedure, or the msg3 of the four-step random access procedure.

As indicated above, FIG. 8 is provided as an example. Other examples may differ from what is described with regard to FIG. 8.

Figure 9:
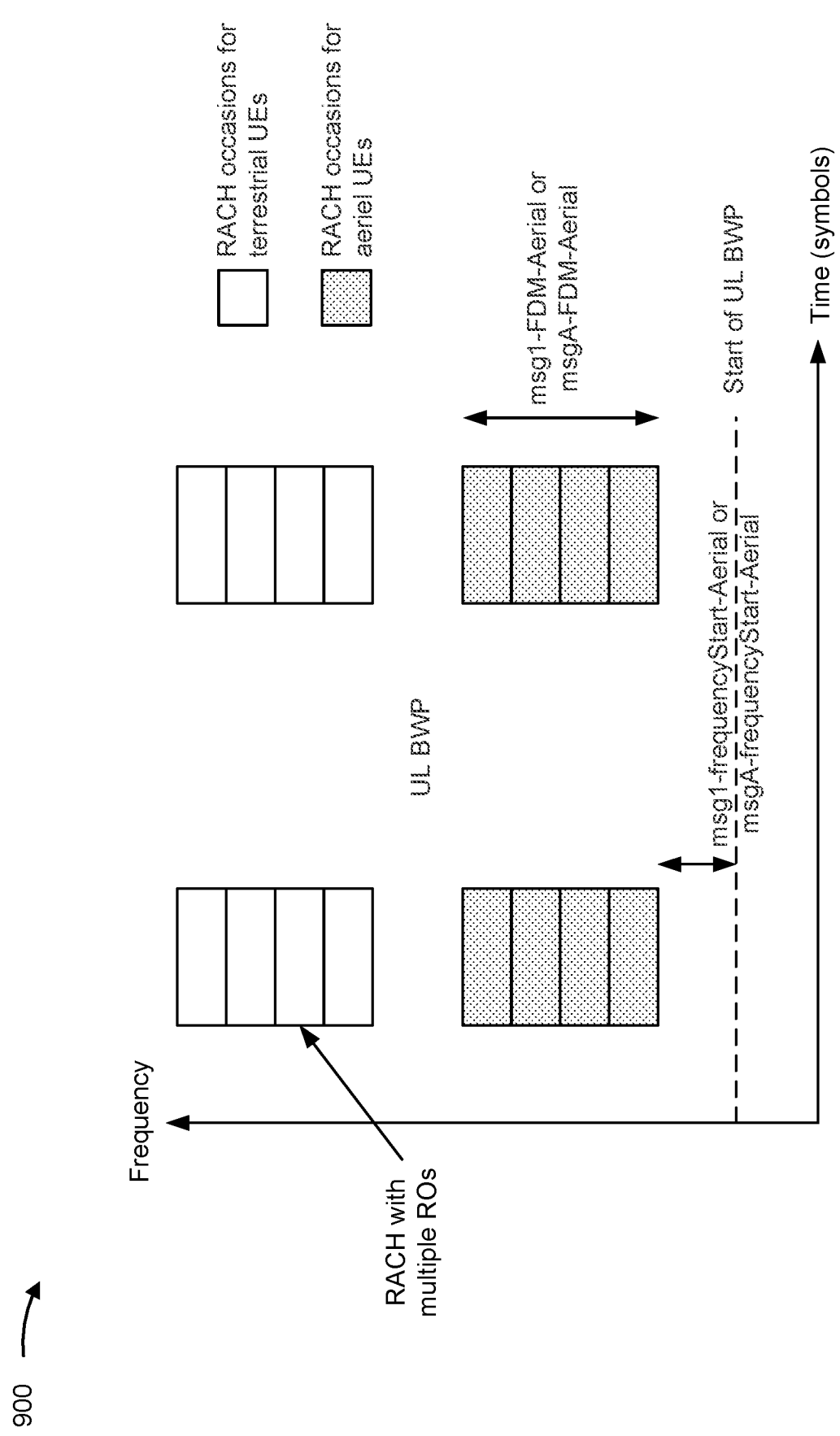
FIG. 9 is a diagram illustrating an example associated with random access channel (RACH) occasions for aerial UEs, in accordance with the present disclosure.

FIG. 9 is a diagram illustrating an example 900 associated with RACH occasions for aerial UEs, in accordance with the present disclosure.

As shown in FIG. 9, a base station may configure different RACH occasions with different frequency multiplicity for aerial UEs in an uplink BWP. An uplink bandwidth part may be associated with RACH occasions for aerial UEs and RACH occasions for terrestrial UEs (or non-aerial UEs), where the RACH occasions for the aerial UEs may be separate from the RACH occasions for the terrestrial UEs. The RACH occasions for aerial UEs may be associated with aerial-specific parameters. For example, the RACH occasions for the aerial UEs may be associated with a msg1 frequency start aerial (msg1-frequencyStart-Aerial) parameter or a msgA frequency start aerial (msgA-frequencyStart-Aerial) parameter, in relation to a start of the uplink BWP. As another example, a RACH occasion for an aerial UE may be associated with a msg1 FDM aerial (msg1-FDM-Aerial) parameter or a msgA FDM aerial (msgA-FDM-Aerial) parameter, which may indicate a quantity of RACH occasions in a frequency domain for msg1 or msgA, respectively.

As indicated above, FIG. 9 is provided as an example. Other examples may differ from what is described with regard to FIG. 9.

Figure 10:
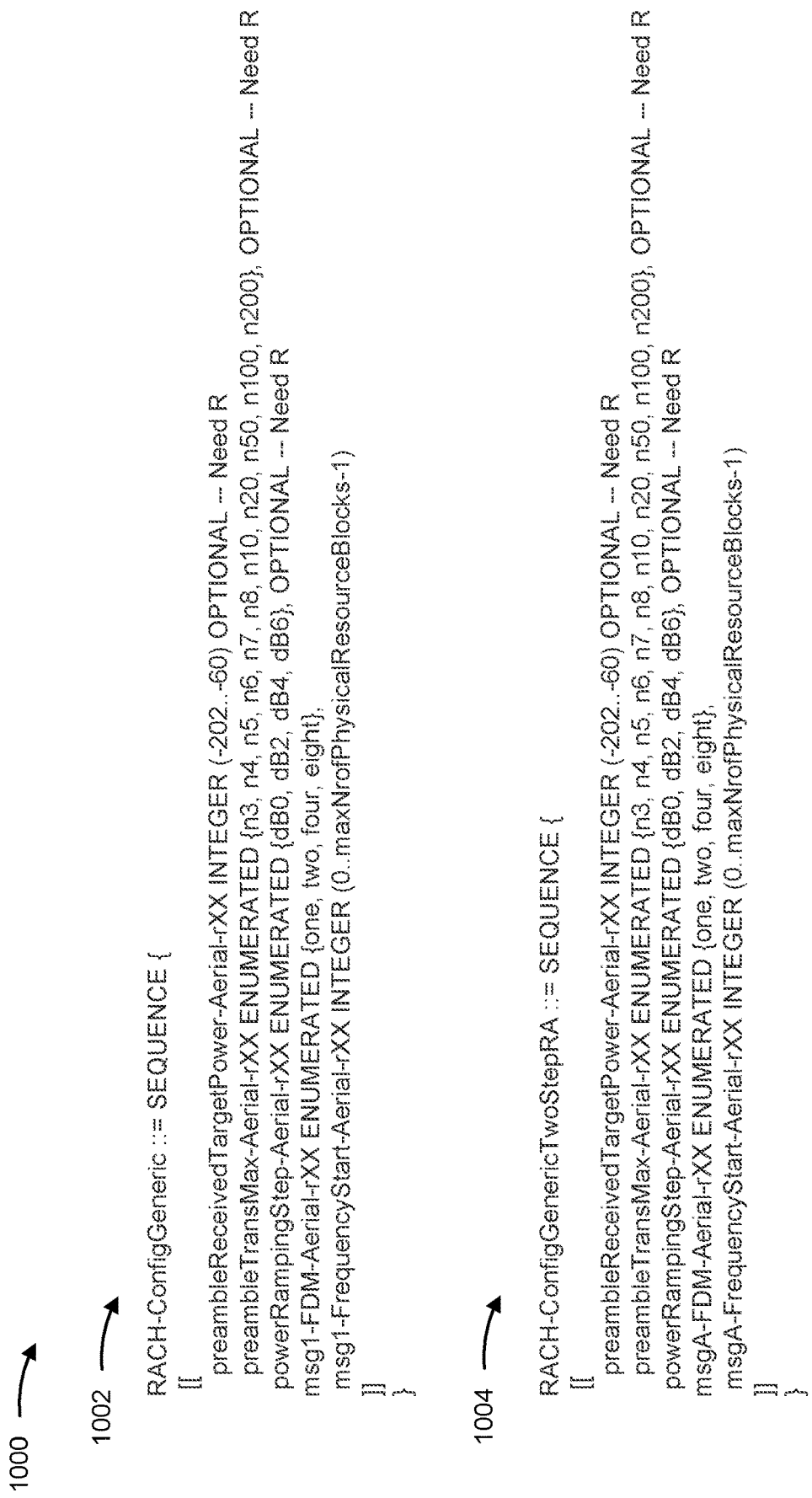
FIG. 10 is a diagram illustrating an example associated with indicating power control parameters, in accordance with the present disclosure.

FIG. 10 is a diagram illustrating an example 1000 associated with indicating power control parameters, in accordance with the present disclosure.

In some aspects, a SIB1 may configure separate power control parameters for aerial UEs in relation to terrestrial UEs. The SIB1 may configure separate power control parameters for msg1 and msgA.

As shown by reference number 1002, a SIB1 may indicate a RACH configuration (RACH-ConfigGeneric) for aerial UEs, which may be associated with a four-step random access procedure for aerial UEs. The RACH configuration may indicate a preamble received target power (preambleReceivedTargetPower-Aerial) parameter for aerial UEs. The RACH configuration may indicate a preamble transmission maximum (preambleTransMax-Aerial) parameter for aerial UEs. The RACH configuration may indicate a power ramping step (powerRampingStep-Aerial) parameter for aerial UEs. The RACH configuration may indicate a msg1 FDM (msg1-FDM-Aerial) parameter for aerial UEs. The RACH configuration may indicate a msg1 frequency start (msg1-FrequencyStart-Aerial) parameter for aerial UEs.

As shown by reference number 1004, a SIB1 may indicate a RACH configuration (RACH-ConfigGenericTwoStepRA) for aerial UEs, which may be associated with a two-step random access procedure for aerial UEs. The RACH configuration may indicate a preamble received target power (preambleReceivedTargetPower-Aerial) parameter for aerial UEs. The RACH configuration may indicate a preamble transmission maximum (preamble TransMax-Aerial) parameter for aerial UEs. The RACH configuration may indicate a power ramping step (powerRampingStep-Aerial) parameter for aerial UEs. The RACH configuration may indicate a msgA FDM (msgA-FDM-Aerial) parameter for aerial UEs. The RACH configuration may indicate a msgA frequency start (msgA-FrequencyStart-Aerial) parameter for aerial UEs.

As indicated above, FIG. 10 is provided as an example. Other examples may differ from what is described with regard to FIG. 10.

In some aspects, when a BWP selected for a random access procedure is configured with random access resources for both a two-step random access procedure and a four-step random access procedure, aerial UEs may be configured with an ability to select either the two-step random access procedure or the four-step random access procedure. In some aspects, the two-step random access procedure may be barred for aerial UEs, since a likelihood of failure resulting from the two-step random access procedure may be higher for aerial UEs as compared to terrestrial UEs. In some aspects, for the two-step random access procedure, a msgA RSRP threshold for aerial UEs (msgA-RSRP-Threshold-Aerial) may be configured differently as compared to a msgA RSRP threshold for terrestrial UEs. For example, a msgA RSRP threshold for aerial UEs may be greater than a msgA RSRP threshold for terrestrial UEs, since aerial UEs may be associated with better coupling loss but a worse geometry (e.g., relative arrangement) as compared to terrestrial UEs. As a result, aerial UEs may have a higher chance of random access failure in the two-step random access procedure as compared to terrestrial UEs.

For terrestrial UEs, when an RSRP of a downlink pathloss reference satisfies a msgA RSRP threshold, a terrestrial UE may select a two-step random access procedure. When the RSRP of the downlink pathloss reference signal does not satisfy the msgA RSRP threshold, the terrestrial UE may select a four-step random access procedure.

FIG. 11 is a diagram illustrating an example 1100 associated with indicating a random access type, in accordance with the present disclosure.

As shown in FIG. 11, a SIB1 may indicate a msgA RSRP threshold for terrestrial UEs, which may become operational when both a two-step random access procedure and a four-step random access procedure are configured. The SIB1 may indicate a msgA RSRP threshold for aerial UEs (msgA-RSRP-Threshold-Aerial) parameter, which may be different than the msgA RSRP threshold for terrestrial UEs. Alternatively, the SIB1 may indicate a two-step random access prohibited (isTwoStepRAProhibited) parameter, which may indicate whether the two-step random access procedure is barred for aerial UEs.

As indicated above, FIG. 11 is provided as an example. Other examples may differ from what is described with regard to FIG. 11.

In some aspects, a msgA PUSCH may be separately configured for aerial UEs as compared to terrestrial UEs. For example, resource blocks for msgA PUSCH occasions and msgA PUSCH power control may be separately configured for aerial UEs as compared to terrestrial UEs.

In some aspects, resource blocks for msgA PUSCH occasions for aerial UEs may not overlap in time and/or frequency with resource blocks for msgA PUSCH occasions for terrestrial UEs. Resource blocks for the msgA PUSCH occasions for aerial UEs and resource blocks for the msgA PUSCH occasions for terrestrial UEs may be configured separately for aerial UEs and terrestrial UEs. Separate parameters may be signaled to the aerial UEs in relation to the terrestrial UEs. The separate parameters for the aerial UEs may include a frequency start msgA PUSCH for aerial UEs (frequency StartMsgA-PUSCH-Aerial) parameter, a guard band msgA PUSCH for aerial UEs (guardBandMsgA-PUSCH-Aerial) parameter, and/or a number of msgA PUSCH occasions FDM for aerial UEs (nrofMsgA-PO-FDM-Aerial) parameter.

In some aspects, msgA PUSCH power control for aerial UEs may be different than msgA PUSCH power control for terrestrial UEs. MsgA PUSCH power control parameters may be configured separately for aerial UEs and terrestrial UEs. Separate power control parameters may be signaled to the aerial UEs in relation to the terrestrial UEs. The separate power control parameters for the aerial UEs may include a msgA alpha for aerial UEs (MsgA-Alpha-Aerial) parameter and/or a msgA delta preamble for aerial UEs (msgA-DeltaPreamble-Aerial) parameter. The separate power control parameters may be indicated in a msgA PUSCH configuration information element (IE) of a SIB1.

In some aspects, a msgA PUSCH configuration for aerial UEs may be broadcast in the SIB1. The msgA PUSCH configuration for aerial UEs may be a separate configuration than a msgA PUSCH configuration for terrestrial UEs. Alternatively, a msgA PUSCH configuration may indicate various parameters or sub-configurations for aerial UEs, such as a msgA PUSCH resource group for aerial UEs (msgA-PUSCH-ResourceGroupA-Aerial) parameter, a msgA alpha aerial (MsgA-Alpha-Aerial) parameter, and so on.

FIG. 12 is a diagram illustrating an example 1200 associated with indicating an uplink shared channel configuration for aerial UEs, in accordance with the present disclosure.

As shown in FIG. 12, a SIB1 may indicate a msgA PUSCH configuration for aerial UEs. The msgA PUSCH configuration may indicate a msgA PUSCH first resource group for aerial UEs (msgA-PUSCH-ResourceGroupA-Aerial) parameter, a msgA PUSCH second resource group for aerial UEs (msgA-PUSCH-ResourceGroupB-Aerial) parameter, a msgA transform precoder (msgA-TransformPrecoder) parameter, a msgA data scrambling index (msgA-DataScramblingIndex) parameter, and/or a msgA delta preamble for aerial UEs (msgA-DeltaPreamble-Aerial) parameter.

As indicated above, FIG. 12 is provided as an example. Other examples may differ from what is described with regard to FIG. 12.

In some aspects, Msg3 power control parameters for aerial UEs may be broadcast in the SIB1. The Msg3 power control parameters for aerial UEs may be different than Msg3 power control parameters for terrestrial UEs. One example of a Msg3 power control parameter is a msg3 delta preamble (msg3-DeltaPreamble) parameter, or $\Delta_{PREAMBLE\_Msg3}$. The msg3 delta preamble may be different for aerial UEs as compared to terrestrial UEs.

Figure 13:
FIG. 13 is a diagram illustrating an example associated with associated with indicating power control parameters, in accordance with the present disclosure.

FIG. 13 is a diagram illustrating an example 1300 associated with indicating power control parameters, in accordance with the present disclosure.

As shown in FIG. 13, a SIB1 may indicate a PUSCH configuration. The PUSCH configuration may indicate a msg3 delta preamble for aerial UEs (msg3-DeltaPreamble-Aerial) parameter, which may be separate for aerial UEs as compared to terrestrial UEs.

As indicated above, FIG. 13 is provided as an example. Other examples may differ from what is described with regard to FIG. 13.

Figure 14:
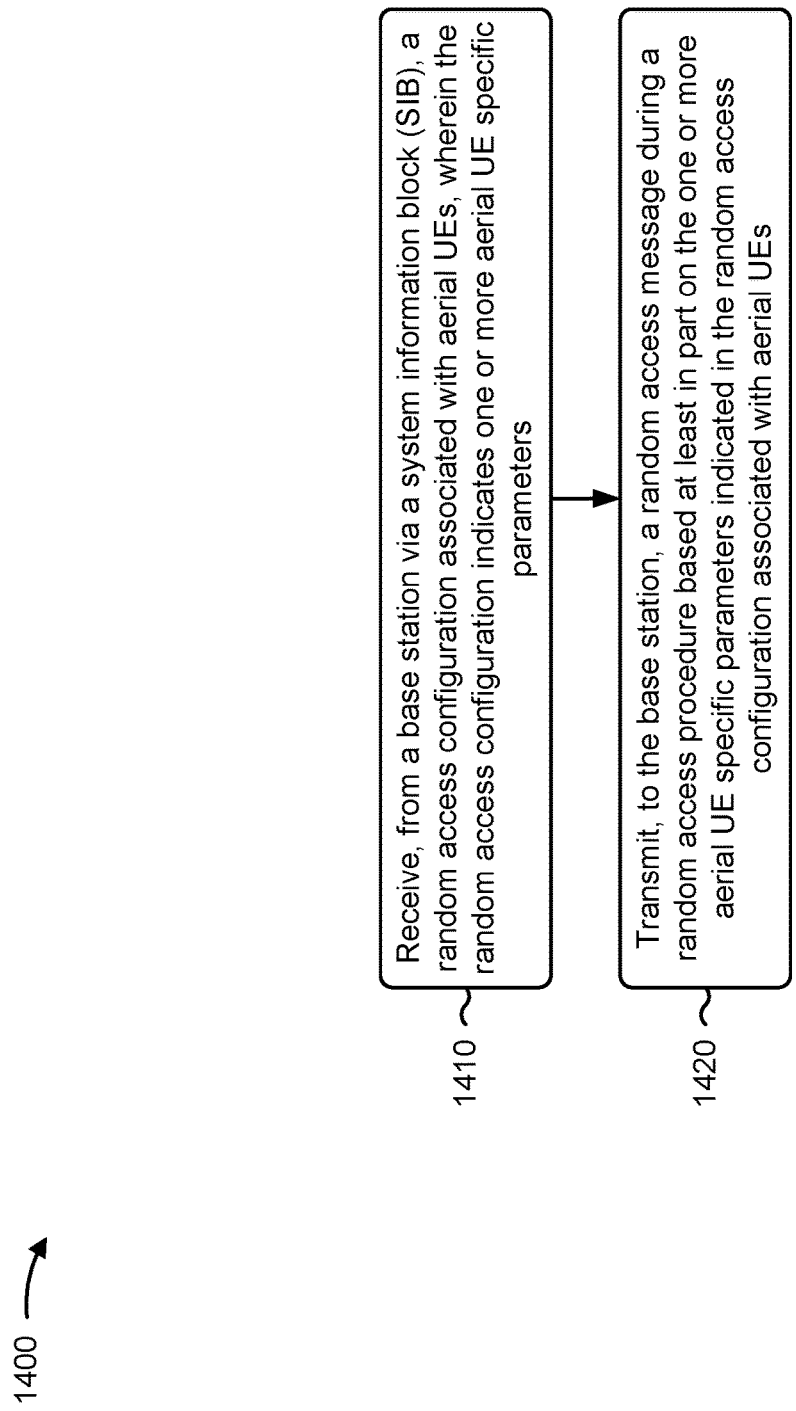
FIGS. 14-15 are diagrams illustrating example processes associated with transmitting random access messages using aerial UE specific parameters, in accordance with the present disclosure.

FIG. 14 is a diagram illustrating an example process 1400 performed, for example, by a UE, in accordance with the present disclosure. Example process 1400 is an example where the UE (e.g., UE 120) performs operations associated with transmitting random access messages using aerial UE specific parameters.

As shown in FIG. 14, in some aspects, process 1400 may include receiving, from a base station via a SIB, a random access configuration associated with aerial UEs, wherein the random access configuration indicates one or more aerial UE specific parameters (block 1410). For example, the UE (e.g., using communication manager 140 and/or reception component 1602, depicted in FIG. 16) may receive, from a base station via a SIB, a random access configuration associated with aerial UEs, wherein the random access configuration indicates one or more aerial UE specific parameters, as described above.

As further shown in FIG. 14, in some aspects, process 1400 may include transmitting, to the base station, a random access message during a random access procedure based at least in part on the one or more aerial UE specific parameters indicated in the random access configuration associated with aerial UEs (block 1420). For example, the UE (e.g., using communication manager 140 and/or transmission component 1604, depicted in FIG. 16) may transmit, to the base station, a random access message during a random access procedure based at least in part on the one or more aerial UE specific parameters indicated in the random access configuration associated with aerial UEs, as described above.

Process 1400 may include additional aspects, such as any single aspect or any combination of aspects described below and/or in connection with one or more other processes described elsewhere herein.

In a first aspect, the UE is an aerial UE based at least in part on one or more of an aerial subscription, a height associated with the UE that satisfies a threshold, or an up-tilted base station beam associated with a random access.

In a second aspect, alone or in combination with the first aspect, the random access message is a msg1 of a four-step random access procedure, a msgA of a two-step random access procedure, or a msg3 of the four-step random access procedure.

In a third aspect, alone or in combination with one or more of the first and second aspects, the random access configuration indicates one or more of random access occasions for aerial UEs, power control parameters for aerial UEs, a random access type, or a msgA PUSCH configuration for aerial UEs.

In a fourth aspect, alone or in combination with one or more of the first through third aspects, the random access occasions for aerial UEs are associated with first frequencies in an uplink bandwidth part, and random access occasions for terrestrial UEs are associated with second frequencies in the uplink bandwidth part, wherein the random access occasions for aerial UEs are associated with a frequency start parameter.

In a fifth aspect, alone or in combination with one or more of the first through fourth aspects, the power control parameters for aerial UEs are different than power control parameters for terrestrial UEs, wherein the power control parameters for aerial UEs include one or more of a preamble received target power parameter, a preamble transmission maximum parameter, a power ramping step parameter, an FDM parameter associated with a msg1 or a msgA of the random access procedure, or a frequency start parameter associated with the msg1 or the msgA of the random access procedure.

In a sixth aspect, alone or in combination with one or more of the first through fifth aspects, the random access type indicates that a two-step random access procedure is barred for aerial UEs.

In a seventh aspect, alone or in combination with one or more of the first through sixth aspects, the random access type indicates a first msgA power threshold associated with aerial UEs and a second msgA power threshold associated with terrestrial UEs, and the UE is configured for either a two-step random access procedure or a four-step random access procedure based at least in part on a bandwidth part selected for the random access procedure being configured for both the two-step random access procedure and the four-step random access procedure.

In an eighth aspect, alone or in combination with one or more of the first through seventh aspects, the first msgA power threshold associated with aerial UEs is greater than the second msgA power threshold associated with terrestrial UEs.

In a ninth aspect, alone or in combination with one or more of the first through eighth aspects, the msgA PUSCH configuration for aerial UEs is different than a msgA PUSCH configuration for terrestrial UEs, wherein the msgA PUSCH configuration for aerial UEs indicates that resource blocks for msgA PUSCH occasions for aerial UEs do not overlap in time or frequency with resource blocks for msgA PUSCH occasions for terrestrial UEs.

In a tenth aspect, alone or in combination with one or more of the first through ninth aspects, the msgA PUSCH configuration for aerial UEs indicates that a msgA PUSCH power control for aerial UEs is different than a msgA PUSCH power control for terrestrial UEs.

In an eleventh aspect, alone or in combination with one or more of the first through tenth aspects, the power control parameters for aerial UEs include a msg3 delta preamble for aerial UEs that is different than a msg3 delta preamble for terrestrial UEs.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
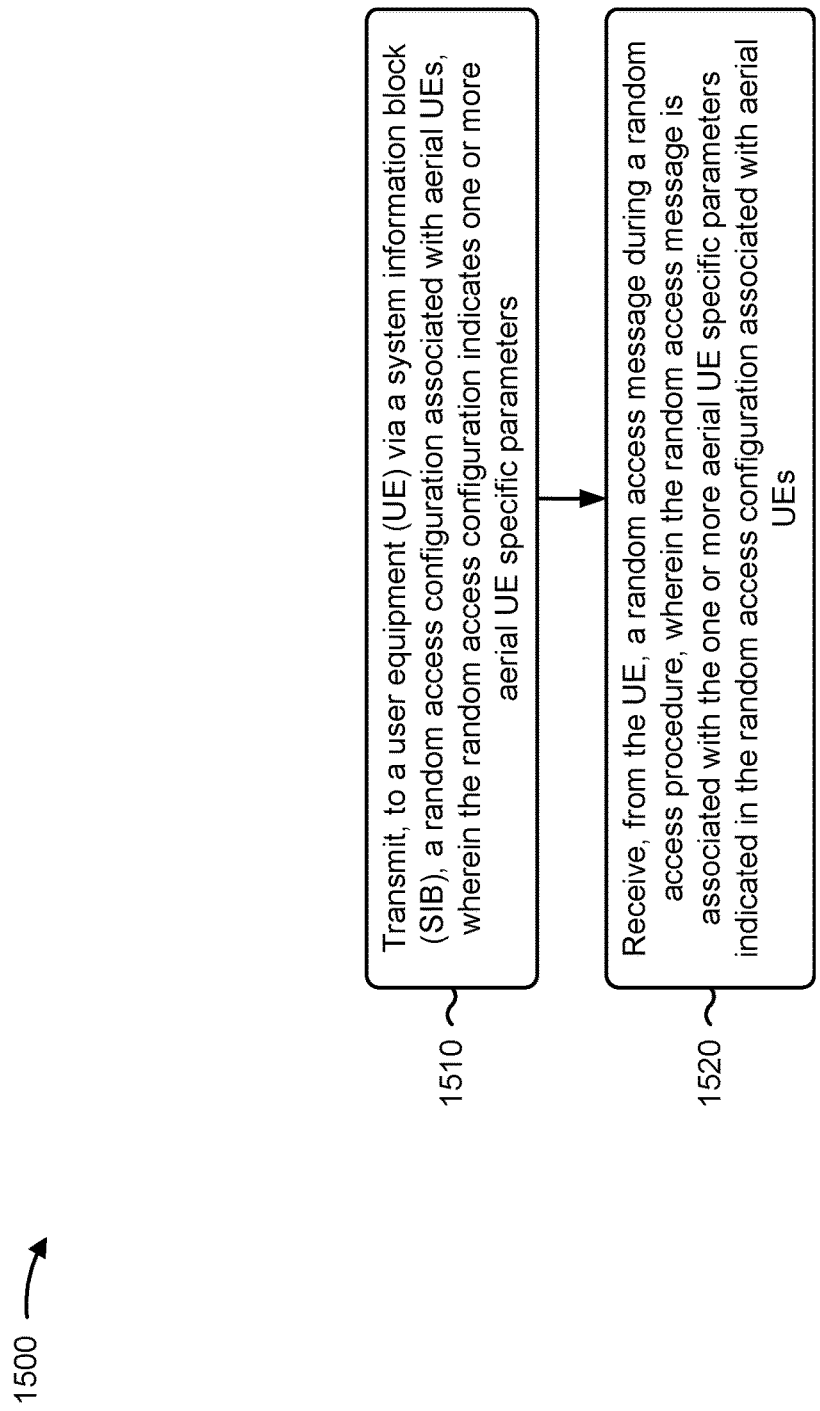

FIG. 15 is a diagram illustrating an example process 1500 performed, for example, by a base station, in accordance with the present disclosure. Example process 1500 is an example where the base station (e.g., base station 110) performs operations associated with transmitting random access messages using aerial UE specific parameters.

As shown in FIG. 15, in some aspects, process 1500 may include transmitting, to a UE via a SIB, a random access configuration associated with aerial UEs, wherein the random access configuration indicates one or more aerial UE specific parameters (block 1510). For example, the base station (e.g., using communication manager 150 and/or transmission component 1702, depicted in FIG. 17) may transmit, to a UE via a SIB, a random access configuration associated with aerial UEs, wherein the random access configuration indicates one or more aerial UE specific parameters, as described above.

As further shown in FIG. 15, in some aspects, process 1500 may include receiving, from the UE, a random access message during a random access procedure, wherein the random access message is associated with the one or more aerial UE specific parameters indicated in the random access configuration associated with aerial UEs (block 1520). For example, the base station (e.g., using communication manager 150 and/or reception component 1704, depicted in FIG. 17) may receive, from the UE, a random access message during a random access procedure, wherein the random access message is associated with the one or more aerial UE specific parameters indicated in the random access configuration associated with aerial UEs, as described above.

Process 1500 may include additional aspects, such as any single aspect or any combination of aspects described below and/or in connection with one or more other processes described elsewhere herein.

In a first aspect, the random access configuration indicates one or more of random access occasions for aerial UEs, power control parameters for aerial UEs, a random access type, or a PUSCH configuration for aerial UEs.

In a second aspect, alone or in combination with the first aspect, the UE is an aerial UE based at least in part on one or more of an aerial subscription, a height associated with the UE that satisfies a threshold, or an up-tilted base station beam associated with a random access, and the random access message is a msg1 of a four-step random access procedure, a msgA of a two-step random access procedure, or a msg3 of the four-step random access procedure.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
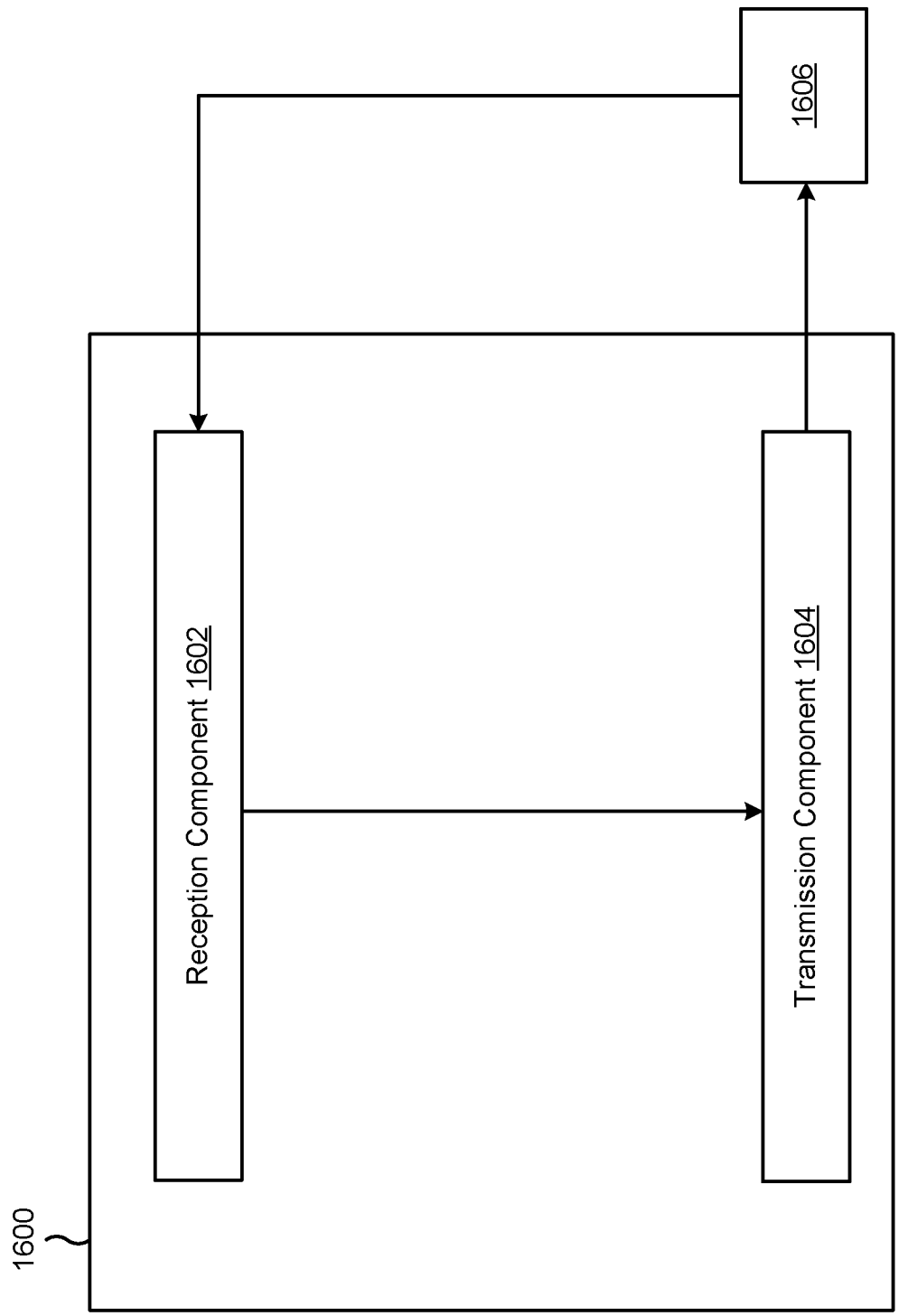
FIGS. 16-17 are diagrams of example apparatuses for wireless communication, in accordance with the present disclosure.

FIG. 16 is a diagram of an example apparatus 1600 for wireless communication. The apparatus 1600 may be a UE, or a UE may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604.

In some aspects, the apparatus 1600 may be configured to perform one or more operations described herein in connection with FIGS. 8-13. Additionally, or alternatively, the apparatus 1600 may be configured to perform one or more processes described herein, such as process 1400 of FIG. 14. In some aspects, the apparatus 1600 and/or one or more components shown in FIG. 16 may include one or more components of the UE described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1606. In some aspects, the reception component 1602 may include one or more antennas, a modem, a demodulator, a MIMO detector, a receive processor, a controller/processor, a memory, or a combination thereof, of the UE described in connection with FIG. 2.

The transmission component 1604 may transmit communications, such as reference signals, control information, data communications, or a combination thereof, to the apparatus 1606. In some aspects, one or more other components of the apparatus 1606 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, a memory, or a combination thereof, of the UE described in connection with FIG. 2. In some aspects, the transmission component 1604 may be co-located with the reception component 1602 in a transceiver.

The reception component 1602 may receive, from a base station via a SIB, a random access configuration associated with aerial UEs, wherein the random access configuration indicates one or more aerial UE specific parameters. The transmission component 1604 may transmit, to the base station, a random access message during a random access procedure based at least in part on the one or more aerial UE specific parameters indicated in the random access configuration associated with aerial UEs.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

Figure 17:
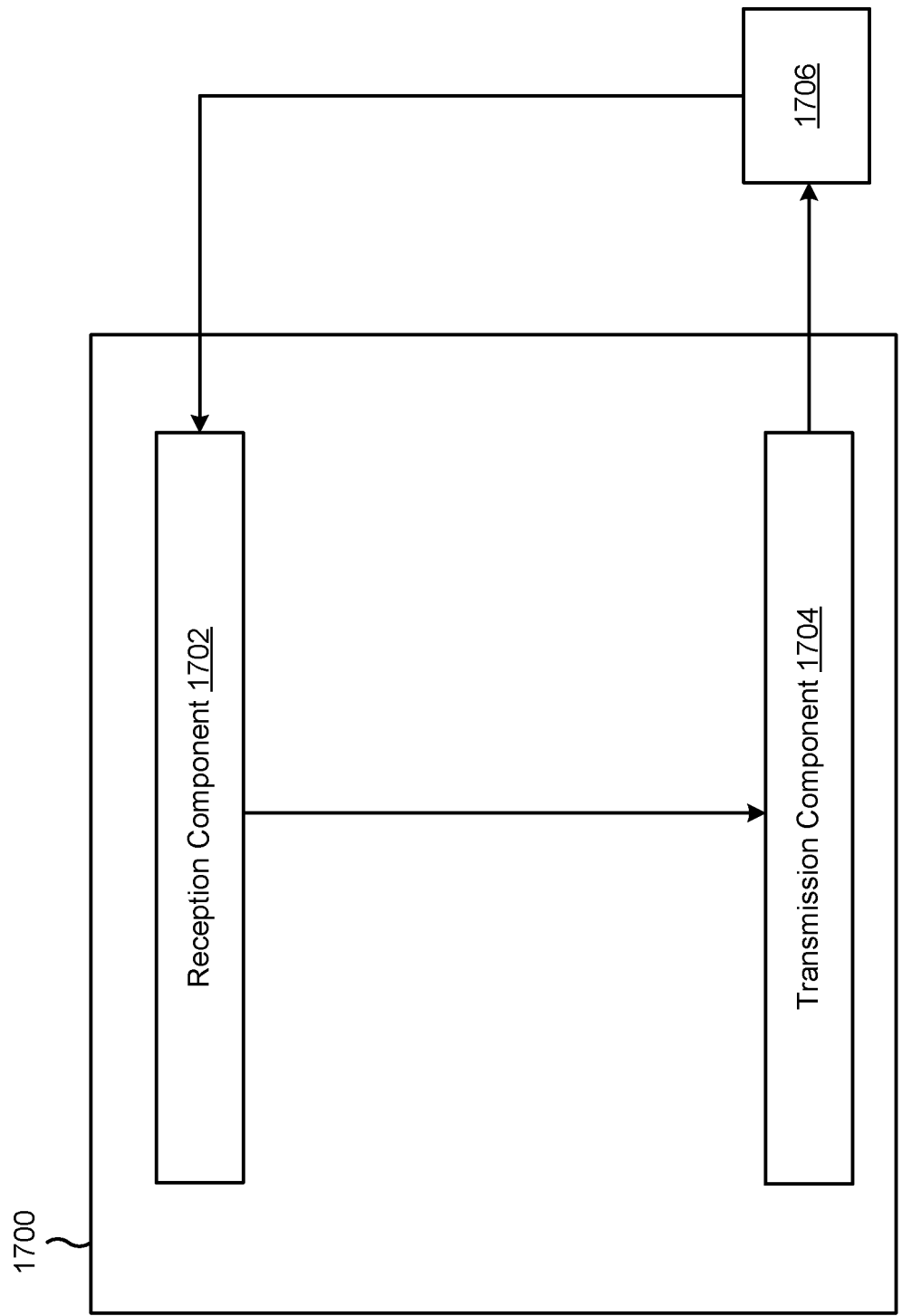

FIG. 17 is a diagram of an example apparatus 1700 for wireless communication. The apparatus 1700 may be a base station, or a base station may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, or another wireless communication device) using the reception component 1702 and the transmission component 1704.

In some aspects, the apparatus 1700 may be configured to perform one or more operations described herein in connection with FIGS. 8-13. Additionally, or alternatively, the apparatus 1700 may be configured to perform one or more processes described herein, such as process 1500 of FIG. 15. In some aspects, the apparatus 1700 and/or one or more components shown in FIG. 17 may include one or more components of the base station described in connection with FIG. 2. Additionally, or alternatively, one or more components shown in FIG. 17 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1706. In some aspects, the reception component 1702 may include one or more antennas, a modem, a demodulator, a MIMO detector, a receive processor, a controller/processor, a memory, or a combination thereof, of the base station described in connection with FIG. 2.

The transmission component 1704 may transmit communications, such as reference signals, control information, data communications, or a combination thereof, to the apparatus 1706. In some aspects, one or more other components of the apparatus 1706 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modem, a modulator, a transmit MIMO processor, a transmit processor, a controller/processor, a memory, or a combination thereof, of the base station described in connection with FIG. 2. In some aspects, the transmission component 1704 may be co-located with the reception component 1702 in a transceiver.

The transmission component 1704 may transmit, to a UE via a SIB, a random access configuration associated with aerial UEs, wherein the random access configuration indicates one or more aerial UE specific parameters. The reception component 1702 may receive, from the UE, a random access message during a random access procedure, wherein the random access message is associated with the one or more aerial UE specific parameters indicated in the random access configuration associated with aerial UEs.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

The following provides an overview of some Aspects of the present disclosure:

Aspect 1: A method of wireless communication performed by a user equipment (UE), comprising: receiving, from a base station via a system information block (SIB), a random access configuration associated with aerial UEs, wherein the random access configuration indicates one or more aerial UE specific parameters; and transmitting, to the base station, a random access message during a random access procedure based at least in part on the one or more aerial UE specific parameters indicated in the random access configuration associated with aerial UEs.

Aspect 2: The method of Aspect 1, wherein the UE is considered to be an aerial UE based at least in part on one or more of: an aerial subscription, a height associated with the UE that satisfies a threshold, or an up-tilted base station beam associated with a random access.

Aspect 3: The method of any of Aspects 1 through 2, wherein the random access message is a message 1 of a four-step random access procedure, a message A of a two-step random access procedure, or a message 3 of the four-step random access procedure.

Aspect 4: The method of any of Aspects 1 through 3, wherein the random access configuration indicates one or more of: random access occasions for aerial UEs, power control parameters for aerial UEs, a random access type, or a message A uplink shared channel configuration for aerial UEs.

Aspect 5: The method of Aspect 4, wherein the random access occasions for aerial UEs are associated with first frequencies in an uplink bandwidth part and random access occasions for terrestrial UEs are associated with second frequencies in the uplink bandwidth part, wherein the random access occasions for aerial UEs are associated with a frequency start parameter.

Aspect 6: The method of Aspect 4, wherein the power control parameters for aerial UEs are different than power control parameters for terrestrial UEs, wherein the power control parameters for aerial UEs include one or more of: a preamble received target power parameter, a preamble transmission maximum parameter, a power ramping step parameter, a frequency division multiplexing parameter associated with a message 1 or a message A of the random access procedure, or a frequency start parameter associated with the message 1 or the message A of the random access procedure.

Aspect 7: The method of Aspect 4, wherein the random access type indicates that a two-step random access procedure is barred for aerial UEs.

Aspect 8: The method of Aspect 4, wherein the random access type indicates a first message A power threshold associated with aerial UEs and a second message A power threshold associated with terrestrial UEs, and the UE is configured for either a two-step random access procedure or a four-step random access procedure based at least in part on a bandwidth part selected for the random access procedure being configured for both the two-step random access procedure and the four-step random access procedure.

Aspect 9: The method of Aspect 8, wherein the first message A power threshold associated with aerial UEs is different than the second message A power threshold associated with terrestrial UEs.

Aspect 10: The method of Aspect 4, wherein the message A uplink shared channel configuration for aerial UEs is different than a message A uplink shared channel configuration for terrestrial UEs, wherein the message A uplink shared channel configuration for aerial UEs indicates that resource blocks for message A uplink shared channel occasions for aerial UEs do not overlap in time or frequency with resource blocks for message A uplink shared channel occasions for terrestrial UEs.

Aspect 11: The method of Aspect 4, wherein the message A uplink shared channel configuration for aerial UEs indicates that a message A uplink shared channel power control for aerial UEs is different than a message A uplink shared channel power control for terrestrial UEs.

Aspect 12: The method of Aspect 4, wherein the power control parameters for aerial UEs include a message 3 delta preamble for aerial UEs that is different than a message 3 delta preamble for terrestrial UEs.

Aspect 13: A method of wireless communication performed by a base station, comprising: transmitting, to a user equipment (UE) via a system information block (SIB), a random access configuration associated with aerial UEs, wherein the random access configuration indicates one or more aerial UE specific parameters; and receiving, from the UE, a random access message during a random access procedure, wherein the random access message is associated with the one or more aerial UE specific parameters indicated in the random access configuration associated with aerial UEs.

Aspect 14: The method of Aspect 13, wherein the random access configuration indicates one or more of: random access occasions for aerial UEs, power control parameters for aerial UEs, a random access type, or a message A uplink shared channel configuration for aerial UEs.

Aspect 15: The method of any of Aspects 13 through 14, wherein: the UE is considered to be an aerial UE based at least in part on one or more of: an aerial subscription, a height associated with the UE that satisfies a threshold, or an up-tilted base station beam associated with a random access; and the random access message is a message 1 of a four-step random access procedure, a message A of a two-step random access procedure, or a message 3 of the four-step random access procedure.

Aspect 16: An apparatus for wireless communication at a device, comprising a processor; memory coupled with the processor; and instructions stored in the memory and executable by the processor to cause the apparatus to perform the method of one or more of Aspects 1-12.

Aspect 17: A device for wireless communication, comprising a memory and one or more processors coupled to the memory, the one or more processors configured to perform the method of one or more of Aspects 1-12.

Aspect 18: An apparatus for wireless communication, comprising at least one means for performing the method of one or more of Aspects 1-12.

Aspect 19: A non-transitory computer-readable medium storing code for wireless communication, the code comprising instructions executable by a processor to perform the method of one or more of Aspects 1-12.

Aspect 20: A non-transitory computer-readable medium storing a set of instructions for wireless communication, the set of instructions comprising one or more instructions that, when executed by one or more processors of a device, cause the device to perform the method of one or more of Aspects 1-12.

Aspect 21: An apparatus for wireless communication at a device, comprising a processor; memory coupled with the processor; and instructions stored in the memory and executable by the processor to cause the apparatus to perform the method of one or more of Aspects 13-15.

Aspect 22: A device for wireless communication, comprising a memory and one or more processors coupled to the memory, the one or more processors configured to perform the method of one or more of Aspects 13-15.

Aspect 23: An apparatus for wireless communication, comprising at least one means for performing the method of one or more of Aspects 13-15.

Aspect 24: A non-transitory computer-readable medium storing code for wireless communication, the code comprising instructions executable by a processor to perform the method of one or more of Aspects 13-15.

Aspect 25: A non-transitory computer-readable medium storing a set of instructions for wireless communication, the set of instructions comprising one or more instructions that, when executed by one or more processors of a device, cause the device to perform the method of one or more of Aspects 13-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
one or more memories; and
one or more processors, coupled to the one or more memories, configured to:
receive, from a network entity via a system information block (SIB), a random access configuration associated with aerial UEs and indicating one or more aerial UE specific parameters, wherein an aerial UE is a UE with an aerial subscription and a terrestrial UE is a UE that does not have the aerial subscription; and
transmit, to the network entity, a random access message during a random access procedure based at least in part on the one or more aerial UE specific parameters indicated in the random access configuration associated with aerial UEs.

2. The apparatus of claim 1, wherein the UE is considered to be an aerial UE based at least in part on one or more of: a height associated with the UE that satisfies a threshold or an up-tilted network entity beam associated with a random access.

3. The apparatus of claim 1, wherein the random access message is a message 1 of a four-step random access procedure, a message A of a two-step random access procedure, or a message 3 of the four-step random access procedure.

4. The apparatus of claim 1, wherein the random access configuration indicates one or more of: random access occasions for aerial UEs, a random access type for aerial UEs, or a message A uplink shared channel configuration for aerial UEs.

5. The apparatus of claim 1, wherein the random access configuration indicates random access occasions for aerial UEs that are associated with first frequencies in an uplink bandwidth part and random access occasions for terrestrial UEs are associated with second frequencies in the uplink bandwidth part, wherein the random access occasions for aerial UEs are associated with a frequency start parameter.

6. The apparatus of claim 1, wherein the random access configuration indicates power control parameters for aerial UEs that are different than power control parameters for terrestrial UEs, wherein the power control parameters for aerial UEs include one or more of: a preamble received target power parameter, a preamble transmission maximum parameter, a power ramping step parameter, a frequency division multiplexing parameter associated with a message 1 or a message A of the random access procedure, or a frequency start parameter associated with the message 1 or the message A of the random access procedure.

7. The apparatus of claim 1, wherein the random access configuration indicates a random access type indicative that a two-step random access procedure is barred for aerial UEs.

8. The apparatus of claim 1, wherein the random access configuration indicates a random access type indicative of a first message A power threshold associated with aerial UEs and a second message A power threshold associated with terrestrial UEs, and the UE is configured for either a two-step random access procedure or a four-step random access procedure based at least in part on a bandwidth part selected for the random access procedure being configured for both the two-step random access procedure and the four-step random access procedure.

9. The apparatus of claim 8, wherein the first message A power threshold associated with aerial UEs is different than the second message A power threshold associated with terrestrial UEs.

10. The apparatus of claim 1, wherein the random access configuration indicates that a message A uplink shared channel configuration for aerial UEs is different than a message A uplink shared channel configuration for terrestrial UEs, wherein the message A uplink shared channel configuration for aerial UEs indicates that resource blocks for message A uplink shared channel occasions for aerial UEs do not overlap in time or frequency with resource blocks for message A uplink shared channel occasions for terrestrial UEs.

11. The apparatus of claim 1, wherein the random access configuration indicates a message A uplink shared channel configuration for aerial UEs that indicates a message A uplink shared channel power control for aerial UEs is different than a message A uplink shared channel power control for terrestrial UEs.

12. The apparatus of claim 1, wherein the random access configuration indicates that power control parameters for aerial UEs include a message 3 delta preamble for aerial UEs that is different than a message 3 delta preamble for terrestrial UEs.

13. An apparatus for wireless communication at a network entity, comprising:
one or more memories; and
one or more processors, coupled to the one or more memories, configured to:
transmit, via a system information block (SIB), a random access configuration associated with aerial user equipments (UEs) and indicating one or more aerial UE specific parameters, wherein an aerial UE is a UE with an aerial subscription and a terrestrial UE is a UE that does not have the aerial subscription; and
receive a random access message during a random access procedure, wherein the random access message is associated with the one or more aerial UE specific parameters indicated in the random access configuration associated with aerial UEs.

14. The apparatus of claim 13, wherein the random access configuration indicates one or more of: random access occasions for aerial UEs, power control parameters for aerial UEs, a random access type, or an uplink shared channel configuration for aerial UEs.

15. The apparatus of claim 13, wherein:
a UE is considered to be an aerial UE based at least in part on one or more of: a height associated with the UE that satisfies a threshold or an up-tilted network entity beam associated with a random access; and
the random access message is a message 1 of a four-step random access procedure, a message A of a two-step random access procedure, or a message 3 of the four-step random access procedure.

16. A method of wireless communication performed by a user equipment (UE), comprising:
receiving, from a network entity via a system information block (SIB), a random access configuration associated with aerial UEs and indicating one or more aerial UE specific parameters, wherein an aerial UE is a UE with an aerial subscription and a terrestrial UE is a UE that does not have the aerial subscription; and transmitting, to the network entity, a random access message during a random access procedure based at least in part on the one or more aerial UE specific parameters indicated in the random access configuration associated with aerial UEs.

17. The method of claim 16, wherein the UE is considered to be an aerial UE based at least in part on one or more of: a height associated with the UE that satisfies a threshold or an up-tilted network entity beam associated with a random access.

18. The method of claim 16, wherein the random access message is a message 1 of a four-step random access procedure, a message A of a two-step random access procedure, or a message 3 of the four-step random access procedure.

19. The method of claim 16, wherein the random access configuration indicates one or more of: random access occasions for aerial UEs, power control parameters for aerial UEs, a random access type, or a message A uplink shared channel configuration for aerial UEs.

20. The method of claim 16, wherein the random access configuration indicates random access occasions for aerial UEs that are associated with first frequencies in an uplink bandwidth part and random access occasions for terrestrial UEs are associated with second frequencies in the uplink bandwidth part, wherein the random access occasions for aerial UEs are associated with a frequency start parameter.

21. The method of claim 16, wherein the random access configuration indicates power control parameters for aerial UEs that are different than power control parameters for terrestrial UEs, wherein the power control parameters for aerial UEs include one or more of: a preamble received target power parameter, a preamble transmission maximum parameter, a power ramping step parameter, a frequency division multiplexing parameter associated with a message 1 or a message A of the random access procedure, or a frequency start parameter associated with the message 1 or the message A of the random access procedure.

22. The method of claim 16, wherein the random access configuration indicates a random access type indicative that a two-step random access procedure is barred for aerial UEs.

23. The method of claim 16, wherein the random access configuration indicates a random access type indicative of a first message A power threshold associated with aerial UEs and a second message A power threshold associated with terrestrial UEs, and the UE is configured for either a two-step random access procedure or a four-step random access procedure based at least in part on a bandwidth part selected for the random access procedure being configured for both the two-step random access procedure and the four-step random access procedure.

24. The method of claim 23, wherein the first message A power threshold associated with aerial UEs is different than the second message A power threshold associated with terrestrial UEs.

25. The method of claim 16, wherein the random access configuration indicates that a message A uplink shared channel configuration for aerial UEs is different than a message A uplink shared channel configuration for terrestrial UEs, wherein the message A uplink shared channel configuration for aerial UEs indicates that resource blocks for message A uplink shared channel occasions for aerial UEs do not overlap in time or frequency with resource blocks for message A uplink shared channel occasions for terrestrial UEs.

26. The method of claim 16, wherein the random access configuration indicates a message A uplink shared channel configuration for aerial UEs that indicates a message A uplink shared channel power control for aerial UEs is different than a message A uplink shared channel power control for terrestrial UEs.

27. The method of claim 16, wherein the random access configuration indicates that power control parameters for aerial UEs include a message 3 delta preamble for aerial UEs that is different than a message 3 delta preamble for terrestrial UEs.

28. A method of wireless communication performed by a network entity, comprising:
   transmitting, via a system information block (SIB), a random access configuration associated with aerial user equipments (UEs) and indicating one or more aerial UE specific parameters, wherein an aerial UE is a UE with an aerial subscription and a terrestrial UE is a UE that does not have the aerial subscription; and
   receiving, from the UE, a random access message during a random access procedure, wherein the random access message is associated with the one or more aerial UE specific parameters indicated in the random access configuration associated with aerial UEs.

29. The method of claim 28, wherein the random access configuration indicates one or more of: random access occasions for aerial UEs, power control parameters for aerial UEs, a random access type, or an uplink shared channel configuration for aerial UEs.

30. The method of claim 28, wherein:
   a UE is considered to be an aerial UE based at least in part on one or more of: a height associated with the UE that satisfies a threshold or an up-tilted network entity beam associated with a random access; and
   the random access message is a message 1 of a four-step random access procedure, a message A of a two-step random access procedure, or a message 3 of the four-step random access procedure.

* * * * *